United States Patent
Matsuki

(10) Patent No.: US 9,720,587 B2
(45) Date of Patent: Aug. 1, 2017

(54) USER INTERFACE DEVICE ENABLING INPUT MOTIONS BY FINGER TOUCH IN DIFFERENT MODES, AND METHOD AND PROGRAM FOR RECOGNIZING INPUT MOTION

(75) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 325 days.

(21) Appl. No.: 14/001,586

(22) PCT Filed: Jun. 29, 2012

(86) PCT No.: PCT/JP2012/066711
§ 371 (c)(1),
(2), (4) Date: Aug. 26, 2013

(87) PCT Pub. No.: WO2013/008649
PCT Pub. Date: Jan. 17, 2013

(65) Prior Publication Data
US 2013/0332892 A1    Dec. 12, 2013

(30) Foreign Application Priority Data

Jul. 11, 2011 (JP) .................... 2011-152819
Mar. 21, 2012 (JP) .................... 2012-063837

(51) Int. Cl.
G06F 3/01    (2006.01)
G06F 3/0488    (2013.01)
(Continued)

(52) U.S. Cl.
CPC ............ *G06F 3/0488* (2013.01); *G06F 3/016* (2013.01); *G06F 3/0416* (2013.01);
(Continued)

(58) Field of Classification Search
CPC ...... G06F 3/016; G06F 3/048; G06F 3/03547; G06F 2203/014
(Continued)

(56) References Cited

U.S. PATENT DOCUMENTS

2004/0021643 A1    2/2004    Hoshino et al.
2008/0024459 A1    1/2008    Poupyrev et al.
(Continued)

FOREIGN PATENT DOCUMENTS

CN    101819486 A    9/2010
CN    101833419 A    9/2010
(Continued)

OTHER PUBLICATIONS

Sep. 18, 2012 International Search Report issued in International Patent Application No. PCT/JP2012/066711.
(Continued)

*Primary Examiner* — Rinna Yi
(74) *Attorney, Agent, or Firm* — Oliff PLC

(57) ABSTRACT

A process is disclosed of operating a user interface device configured to display an image on a display screen and enable user input by a user's finger touch on a touch screen in association with the displayed image, the process including: after the user starts a finger touch on the touch screen, if the user holds the finger at a substantially same location for a duration equal to or longer than a predetermined duration, initiating stationary displaying to display the image stationarily on the display screen, despite any later finger-slide motions on screen; and, after the stationary displaying starts, if a match is made between the finger's contact point on the touch screen and a location of a desirable graphical object included in the image displayed on the display screen, determining that the user has provisionally selected the object.

13 Claims, 9 Drawing Sheets

(51) Int. Cl.
*G06F 3/041* (2006.01)
*G06F 3/0484* (2013.01)
*G06F 3/0485* (2013.01)

(52) U.S. Cl.
CPC ........ *G06F 3/0485* (2013.01); *G06F 3/04842* (2013.01); *G06F 2203/014* (2013.01); *G06F 2203/04105* (2013.01); *H04M 2250/22* (2013.01)

(58) Field of Classification Search
USPC .................. 715/856, 863, 700; 345/157, 173
See application file for complete search history.

(56) References Cited

U.S. PATENT DOCUMENTS

| | | | |
|---|---|---|---|
| 2009/0251410 A1 | 10/2009 | Mori et al. | |
| 2010/0137031 A1 | 6/2010 | Griffin et al. | |
| 2011/0181538 A1* | 7/2011 | Aono | G06F 3/016 345/173 |
| 2012/0268408 A1 | 10/2012 | Chen et al. | |
| 2012/0306759 A1* | 12/2012 | Luo | G06F 3/0233 345/168 |

FOREIGN PATENT DOCUMENTS

| | | |
|---|---|---|
| GB | 2463012 A | 3/2010 |
| JP | A-4-24726 | 1/1992 |
| JP | A-10-171600 | 6/1998 |
| JP | A-2000-194506 | 7/2000 |
| JP | A-2007-10645 | 1/2007 |
| JP | A-2007-148617 | 6/2007 |
| JP | A-2008-33739 | 2/2008 |
| JP | A-2008-77272 | 4/2008 |
| JP | A-2009-245239 | 10/2009 |
| JP | A-2010-55282 | 3/2010 |
| JP | A-2010-211509 | 9/2010 |

OTHER PUBLICATIONS

Sep. 25, 2012 Office Action issued in Japanese Patent Application No. 2011-152819 (with partial translation).
Feb. 5, 2013 Office Action issued in Japanese Patent Application No. 2011-152819 (with partial translation).
Chastain, S., "How to Quickly Select Many Photos in iOS," http://web.archive.org/web/20110606012125/http://graphicsoft.about.com/od/iphoneandipod touchapps/ht/Select-Many-Photos.htm, retrieved on Oct. 22, 2014.
Drekka, "How to bulk select photos on an iPad," <http://web.archive.org/web/20101002070958/http://hints.macworld.com/article.php?story=20100927192140470>, retrieved on Oct. 22, 2014.
Biersdorfer, J.D., iPad 2: The Missing Manual, 2nd Edition, published on Apr. 26, 2011 by O'Reilly Media, Inc., ISBN No. 978-1-4493-0173-6.
Oct. 30, 2014 Extended European Search Report issued in European Patent Application No. 12811480.8.
International Preliminary Report on Patentability issued in International Application No. PCT/JP2012/066711 dated Jan. 14, 2014.
May 22, 2015 Office Action issued in U.S. Appl. No. 14/233,518.

* cited by examiner

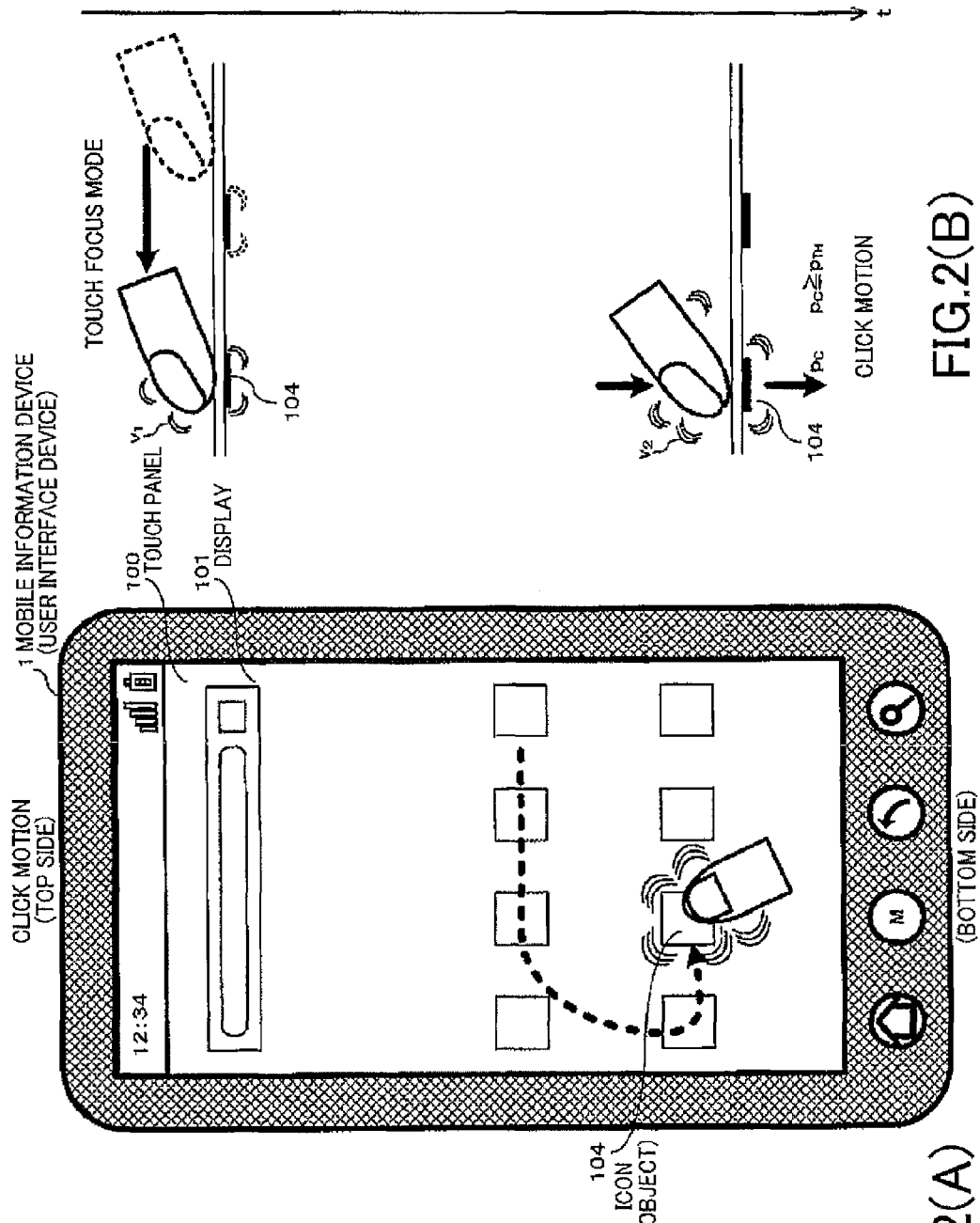

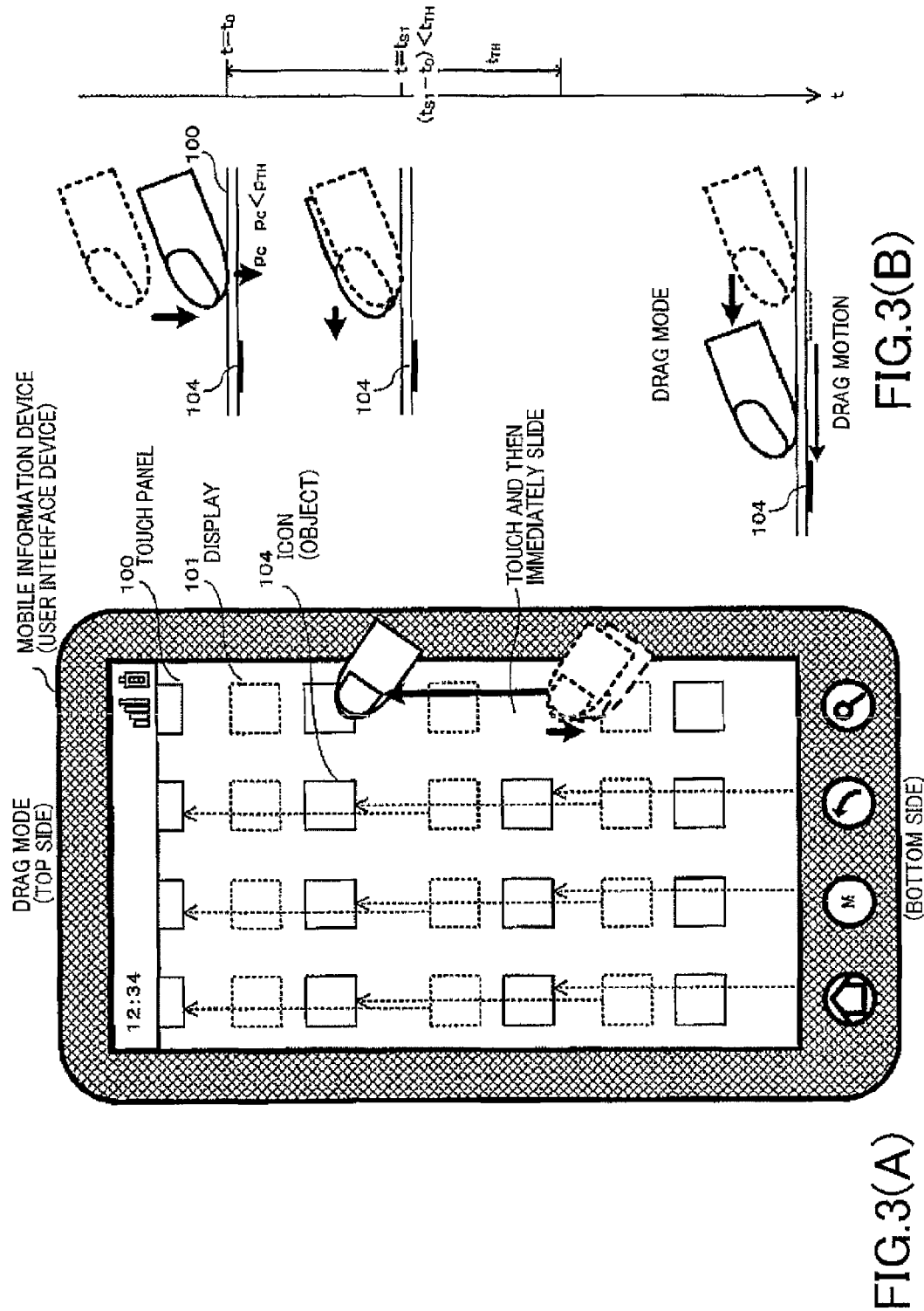

USER INTERFACE DEVICE ENABLING INPUT MOTIONS BY FINGER TOUCH IN DIFFERENT MODES, AND METHOD AND PROGRAM FOR RECOGNIZING INPUT MOTION

TECHNICAL FIELD

The invention relates to techniques directed to user interface devices for displaying an image on a display screen and for allowing a user to perform an input operation or motion by the user's manipulation on a touch screen with the user's finger in association with the displayed image.

BACKGROUND ART

Conventionally, the use of user interface devices is widespread, and the user interface devices enable a user's input motion or operation by manipulating a display screen with the user's finger, stylus, etc. Notably, in recent years, an increasing number of mobile information devices typified by such as smart phones, tablet computers, electronic books or PDAs (Personal Digital Assistants) have incorporated touch panels serving as a user interface device that receives a finger's motion.

Irrespective of whether a touch panel is incorporated or not, a mobile information device is demanded to be downsized for a greater mobility. When a mobile information device is equipped with a user interface device in the form of a plurality of physical input keys or buttons, these keys themselves are needed to be reduced in size, resulting in a risk that the operability of the mobile information device becomes poorer. In contrast, when a mobile information device is equipped with a user interface device in the form of a touch panel using a plurality of virtual buttons instead of physical buttons, these virtual buttons can be well adjusted in size depending on functions assigned to these buttons, resulting in easy designing process for improving the operability of the mobile information device.

On the other hand, the use of a touch panel is more likely to induce incorrect input actions than when physical keys are used instead. More particularly, even a user's unintended touch with a touch panel can be recognized or interpreted as an input action, or a user's intended correct input action can be misrecognized or misinterpreted, failing to activate a desired function, and requiring the user to repeat the same input action.

For dealing with the problems with incorrect input, for example, Patent Document No. 1 discloses a technique of varying the length of a cycle time for repeatedly detecting a user's touches on a touch panel after the user's initial touch on the touch panel is detected. This technique can distinguishably or distinctly recognize the user's brief touch occurring on the touch panel for a very short time, and the user's scrolling action by sliding the user's finger on the touch panel.

In addition, Patent Document No. 2 discloses a technique of displaying a plurality of user-selectable buttons on a touch panel, such that at least one of the displayed buttons is enlarged and rearranged, in response to the touch panel being touched by a user's finger, to thereby help the user to select a desirable one of the buttons. Further, Patent Document No. 3 discloses a technique of vibrating a multi-touch sensitive touch panel enabling detection of concurrent multiple touches on the touch panel, to thereby help a user in tactually perceiving that the user has performed a particular input motion.

It is noted that there is also a technique of detecting a user's press occurring on a touch panel having an electrically conductive film interposed between two opposed elements, and of measuring the intensity of the press (See Patent Document No. 4). Further, there is still also a technique of allowing a user to visually perceive how strong the user has pressed paired touch panels during the user's input motion by touching the two touch panels, based on the user's depth sensation perceived from images displayed on the paired touch panels (See Patent Document No. 5).

PRIOR-ART REFERENCES

Patent Documents

Patent Document No. 1: Japanese Patent Application Publication No. 2007-010645
Patent Document No. 2: Japanese Patent Application Publication No. 2008-077272
Patent Document No. 3: Japanese Patent Application Publication No. 2010-055282
Patent Document No. 4: Japanese Patent Application Publication No. 2000-194506
Patent Document No. 5: Japanese Patent Application Publication No. 2007-148617

SUMMARY OF THE INVENTION

Problem(s) that the Invention Attempts to Solve

Normally, each of many mobile information devices is held by a user with the user's one hand or is one-handed, and the mobile information device is manipulated with one finger of the one hand. Typically, the selected one finger is a thumb that is not used for holding the mobile information device. Due to this, the number of available different motions produced by the selected one finger (i.e., input actions that are recognized to reflect the user's exact intent and inputted into the mobile information device, only when the user has performed the input actions in an exact manner) is still limited even when the above-mentioned countermeasures are taken to avoid incorrect input.

More specifically, in an example of traditional mobile information devices, a motion required for a user to slide an integral image on a display screen is a drag motion. A drag motion refers to a motion or gesture produced by touching a touch panel with the user's finger and sliding the finger in contact with the touch panel or without removing or releasing the finger from the touch panel (i.e., a touch-and-slide motion).

Thus, a traditional mobile information device is given a drag motion as the only acceptable motion, which is to say, one of the user's regular gestures, more specifically, a composite motion of a touch and a slide in series, and therefore, the user is forced to operate the traditional mobile information device with a finger of the user's one hand with which the user holds the mobile information device, under a constraint that the number of allowable different finger motions is limited. Recently, a mobile information device has been configured to be able to invoke a variety of functions. For this reason, there is a demand that a mobile information device should accept more different input motions, but this demand cannot be well satisfied under the above-mentioned constraint.

In addition, the problems discussed above would not be physically solved by techniques, such as disclosed in Patent Document Nos. 1-5, which are not originally directed to sliding an integral image on a display screen as the user's finger slides on screen.

Then, the object of the present invention is to provide a user interface device allowing a user to perform input motions using a touch panel with the user's different finger-touch motions, a method of recognizing an input motion, and the associated program.

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) A user interface device operable to perform a display function to display on a display screen an image including an object to be manipulated by a user, and a touch panel function to output successive locations of the user's finger contact point on a touch screen over time, the user interface device having a drag mode in which a finger-slide motion on the touch panel is recognized as a drag motion, the drag mode serving as an operable mode for recognizing a type of a movement of the finger contact point on the touch panel, the user interface device comprising:

a contact-duration determining unit configured to determine whether or not a stationary-contact duration during which the finger contact point is held substantially stationarily on the touch screen is equal to or longer than a predetermined duration;

a mode activating unit configured to be operable in response to the contact-duration determining unit determining that the stationary-contact duration is equal to or longer than the predetermined duration, to determine that the user's motion does not fall within the drag motion, and to then activate a touch focus mode for monitoring locations of the finger contact point, instead of activating the drag mode, with an integral image including the object stationarily displayed on the display screen, despite any later finger-slide motions on the touch screen;

a contact-location determining unit configured to determine whether or not the finger contact point overlaps a region of the object displayed on the display screen, during the touch focus mode; and a motion-recognition controller configured to be operable in response to the contact-location determining unit determining that the finger contact point overlaps the region of the object displayed on the display screen, to recognize that the user has performed a focusing motion for provisional selection of the object.

(2) The user interface device according to mode (1), wherein the mode activating unit is configured to activate the drag mode when the stationary-contact duration does not exceed the predetermined duration, and activate the touch focus mode when the stationary-contact duration is equal to or longer than the predetermined duration.

(3) The user interface device according to mode (1) or (2), further comprising:

a haptic feedback arrangement configured to impart haptic feedback to the user's finger in contact with the touch screen; and a haptic feedback controller configured to be operable in response to the motion-recognition controller recognizing that the user has performed the focusing motion, to control the haptic feedback arrangement to impart the haptic feedback to the finger via the touch screen.

(4) The user interface device according to mode (3), wherein the haptic feedback controller is configured to be operable in response to the finger's predetermined motion, to control the haptic feedback arrangement to impart vibrations to the finger, the vibrations being as a response to the finger's motion, the vibrations substantially simulating a tactile sensation that the finger would experience from a physical button by pressing the physical button instead of a virtual button.

(5) The user interface device according to any one of modes (1)-(4), further comprising:

a pressing-force sensor detecting a pressing force with which the finger presses the touch screen; and a pressing-force determining unit configured to determine whether or not the detected pressing force is equal to or greater than a predetermined threshold, wherein the motion-recognition controller includes a first click determining unit configured to be operable in response to an event occurring in which, during the touch focus mode, the contact-location determining unit determines that the finger contact point overlaps the region of the object displayed on the display screen, and the pressing-force determining unit determines that the pressing force is equal to or greater than the predetermined threshold, to determine that the user has performed a click motion for invoking a function assigned to the object that has provisionally been selected by the user.

(6) The user interface device according to any one of modes (1)-(5), further comprising:

a pressing-force sensor detecting a pressing force with which the finger presses the touch screen; and a pressing-force determining unit configured to determine whether or not the detected pressing force is equal to or greater than a predetermined threshold, wherein the motion-recognition controller includes a second click determining unit configured to be operable in response to an event occurring in which, after a finger touch on the touch screen starts, the contact-location determining unit determines that the finger contact point overlaps the region of the object displayed on the display screen, and the pressing-force determining unit determines that the pressing force is equal to or greater than the predetermined threshold, irrespective of whether or not the contact-duration determining unit determines that the stationary-contact duration is equal to or longer than the predetermined duration, to determine that the user has performed a click motion for invoking a function assigned to the object that has provisionally been selected by the user.

(7) The user interface device according to any one of modes (1)-(6), wherein the predetermined duration is longer than an average duration required from a beginning of a finger touch on the touch screen until a beginning of a subsequent finger-slide motion on the touch screen, with the user's intention to perform the drag motion, and is shorter than an average duration required from a beginning of a finger touch on the touch screen until a beginning of a subsequent finger-slide motion on the touch screen, with the user's intention to perform a motion for selecting the object displayed on the display screen.

(8) The user interface device according to any one of modes (1)-(7), wherein the contact-duration determining unit is configured to measure the stationary-contact duration, irrespective of whether or not the finger's contact point overlaps the region of the object displayed on the display screen.

(9) A method of recognizing a user input motion performed on a user interface device operable to perform a display function to display on a display screen an image including an object to be manipulated by a user, and a touch panel function to output successive locations of the user's finger contact point on a touch screen over time, the user interface device having a drag mode in which a finger-slide motion on the touch screen is recognized as a drag motion, the drag mode serving as an operable mode for recognizing a type of a movement of the finger contact point on the touch screen, the method comprising:

a first step of determining whether or not a stationary-contact duration during which the finger contact point is held substantially stationarily on the touch screen is equal to or longer than a predetermined duration;

a second step, operable in response to a determination being made in the first step that the stationary-contact duration is equal to or longer than the predetermined duration, of determining that the user's motion does not fall within the drag motion, and of then activating a touch focus mode for monitoring locations of the finger contact point, instead of activating the drag mode, with an integral image including the object stationarily displayed on the display screen, despite any later finger-slide motions on the touch screen;

a third step of determining whether or not the finger contact point overlaps a region of the object displayed on the display screen, during the touch focus mode; and a fourth step, operable in response to a determination being made in the third step that the finger contact point overlaps the region of the object displayed on the display screen, of recognizing that the user has performed a focusing motion for provisional selection of the object.

(10) The method according to mode (9), wherein the first step is performed irrespective of whether or not the finger's contact point overlaps the region of the object displayed on the display screen.

(11) A process of operating a user interface device configured to display an image on a display screen and enable user input by a user's finger touch on a touch screen in association with the displayed image, the process comprising:

a first step, in response to an event occurring in which, after the user starts a finger touch on the touch screen, the user holds the finger at a substantially same location for a duration equal to or longer than a predetermined duration, of initiating stationary displaying to display the image stationarily on the display screen, despite any later finger-slide motions on screen; and a second step, in response to an event occurring in which, after the stationary displaying starts, a match is made between the finger's contact point on the touch screen and a location of a desirable graphical object included in the image displayed on the display screen, of determining that the user has provisionally selected the object.

(12) The process according to mode (11), further comprising a third step, in response to an event occurring in which, after a determination is made that the user has provisionally selected the object, an intensity of the user's finger touch on the touch screen increases over time, of determining that the user has performed a click motion for invoking a function pre-assigned to the object that has provisionally been selected by the user.

(13) The process according to mode (11) or (12), further comprising a third step, in response to an event occurring in which, after a finger touch on the touch screen starts, irrespective of whether or not the predetermined duration expires, a match is made between the finger's contact point on the touch screen and the location of the object displayed on the display screen, and in which the intensity of the user's finger touch on the touch screen increases over time, of determining that the user has performed a click motion for invoking a function pre-assigned to the object that has provisionally been selected by the user.

(14) A program to be executed by a computer to perform the method according to any one of modes (9)-(13).

Advantageous Effects of the Invention

A user interface device according to the present invention allows a user to perform an input motion using a touch panel by the user's finger motions in contact with the touch panel in different modes or patterns, and the same holds true for a method of recognizing an input motion and the associated program, each of which is according to the present invention.

BRIEF DESCRIPTION OF THE DRAWINGS

FIG. 2(A) is a front view illustrating the mobile information device depicted in FIG. 1, together with the user's finger motions occurring in a click motion, and FIG. 2(B) is a side view illustrating the finger motions in enlargement.

FIG. 3(A) is a front view illustrating the mobile information device depicted in FIG. 1, together with the user's finger motions occurring in a drag mode, and FIG. 3(B) is a side view illustrating the finger motions in enlargement.

EMBODIMENTS OF THE INVENTION

Figures 1A, 1B:
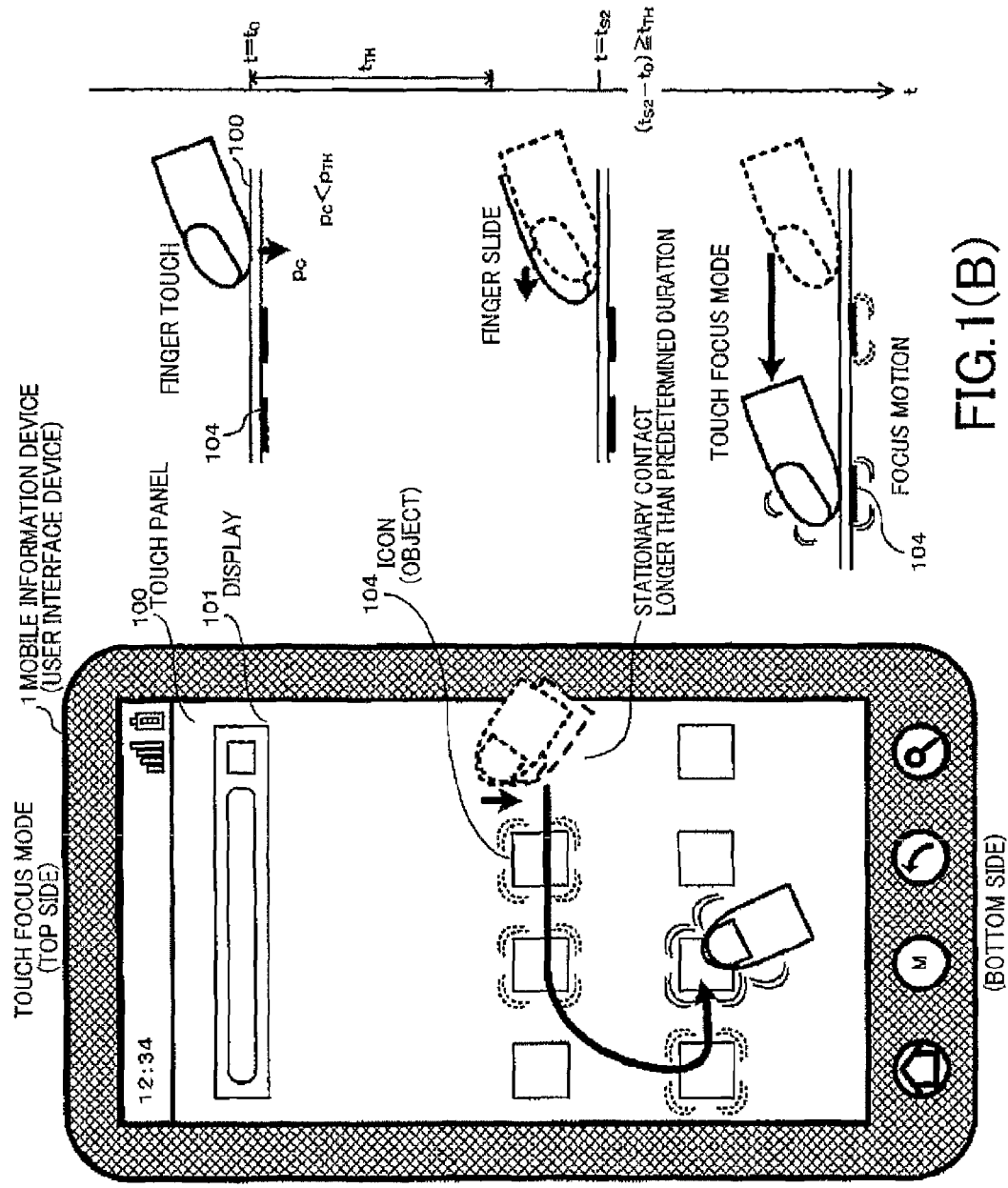
FIG. 1(A) is a front view illustrating a mobile information device incorporating a user interface device according to a first illustrative embodiment of the invention, together with a user's finger motions occurring in a touch focus mode.
FIG. 1(B) is a side view illustrating the finger motions in enlargement.

Illustrative embodiments of the invention will be described below with reference to the drawings.

A user interface device to which the invention is directed allows a user to enter information by finger motions in contact with a touch panel. Because of this, each of a majority of user interface devices of this type is incorporated in a mobile information device that can be held by a user with the hand (s) during manipulation, such as a smart phone or a tablet computer. Under these circumstances, illustrative embodiments of the invention will be described below by taking examples of user interface devices that the invention is practiced in, wherein the user interface devices are built in mobile information devices.

First, the embodiments of the invention will be outlined with regard to features shared therebetween, which include a feature that each of mobile information devices according to the embodiments of the invention is configured such that, upon reception of the user's input action, that is, a finger composite-motion of a finger touch and a subsequent finger slide in contact with the touch panel (i.e., a touch-and-slide motion), the mobile information device does not automatically recognize such an input action as a drag motion without exception, and the mobile information device automatically selects one of a plurality of available input modes depending on the type of each individual input motion or action. In other words, the mobile information device automatically recognizes the type of an actual input action, and selects an input mode depending on the type or category of the recognized input motion.

More specifically, the mobile information device is configured to determine whether or not the user's finger contact point on the touch panel has been held stationarily for a duration equal to or longer than a predetermined duration (irrespective of whether or not the finger contact point overlaps the region of any one of objects (e.g., icons, keys, items) displayed on the touch panel), that is, whether or not a contact or stay duration during which the finger contact point is held substantially stationarily is equal to or longer than the predetermined duration (i.e., an initial finger-contact is followed by a finger-slide motion after the predetermined duration expires).

If the stationary-contact duration is equal to or longer than the predetermined duration, then it is determined that the current input action does not qualify as a normal drag motion, which invokes or activates a touch focus mode. If, however, the stationary-contact duration does not reach the predetermined duration (i.e., an initial finger-contact is followed by a finger-slide motion before the predetermined duration expires), then it is determined that the current input action qualifies as a normal drag motion, which invokes a drag mode.

Those input modes are as follows:
(1) Touch Focus Mode: a mode for monitoring the locations of finger contact points on screen while an integral image is being displayed on screen stationarily or fixedly despite any finger-slide motions
(2) Drag Mode: a mode for sliding an integral image displayed on screen to track the movement of the finger.

Thus, the embodiments of the invention are featured by measuring the length of a time duration during which the finger is kept in contact with the screen, selecting one of a plurality of input modes, based on the measurement, and operating the system in a manner depending on the selected input mode.

In this regard, the term "integral image" refers to a portion of a full image that is displayed entirely on a display screen of a display unit, which is subject to a slide motion (including a motion qualifying as a scroll motion) on the display screen. Not to mention, the portion can be the full image, which is displayed entirely on the display screen. For example, when an original image has a larger size than that of the display screen, the original image includes a portion that cannot be covered by the display screen, which is (or is assumed to be) a hidden portion laid outside the display screen. When there is a need for displaying the hidden portion on the display screen, the hidden portion is manipulated by the user for imparting a slide motion thereto.

FIG. 1 illustrates a mobile information device 1 according to an illustrative first embodiment of the invention (e.g., a smart phone, a tablet computer, an e-book, a PDA (Personal Data Assistant), etc.), and, more specifically, a front view of the mobile information device 1 and a side view illustrating an example of a series of finger motions, both of which are for illustration of a touch focus mode.

FIG. 1(A) is a front view of the mobile information device 1. As illustrated in this front view, an image containing a plurality of icons (each of which forms an example of a graphical object) 104 is displayed on a display screen of a display 101. Each icon 104, which is to be manipulated by a user, can be selected by a user motion or action performed in predetermined patterns as described below, and, upon selection, each icon 104 invokes a function pre-assigned to each icon 104. In addition, a touch panel 100 is disposed on the display screen of the display 101, and the touch panel 100 is configured to output successive locations of a finger contact point on the touch panel 100 over time.

Now, the touch focus mode will be described by way of an example depicted in FIG. 1(A). As illustrated in FIG. 1(A), in this example, the user touches a touch panel 100 with the user's finger, next holds the finger at the same contact point for a duration equal to or longer than a predetermined duration, and then slides the finger on and along the touch panel 100. However, unlike a traditional drag motion, a finger-slide motion does not cause an integral image containing the icons 104 to slide, during stationary displaying of the integral image.

As a result, the user can singularly and successively touch the plurality of icons 104 that are stationarily displayed on the display screen, by sliding the finger without release from the display screen. In addition, a contact-location determining unit 12 (see FIG. 5), as described below, is configured to be operable also in the course of a finger-slide motion, to determine whether the finger contact point overlaps the region of any one of the icons 104 being displayed on the display screen. The touch focus mode allows a finger contact point to be monitored over time during stationary displaying of the integral image.

The touch focus mode is invoked in an example case where, when a desired icon 104 is located within the displayed image on screen, the user intends to touch the display screen at a point near the region of the desired icon 104 being displayed, and then intends to slide the finger to the region of the desired icon 104 being displayed with certainty. In addition, this touch focus mode is also invoked where the user intends to touch the display screen in the region of the desired icon 104 being displayed, and then intends to immediately select the desired icon 104. Further, this touch focus mode is still also invoked where the user intends to move the finger exactly up to the region of the desired icon 104 being displayed, by swiping the finger across the touch panel 100 (i.e., the displayed image), to determine whether or not the displayed image contains the desired icon 104.

FIG. 1(B) is a schematic diagram illustrating finger motions for explanation of the conditions to be met for invoking the touch focus mode as described above. In an example depicted in this schematic diagram, initially, the user touches the touch panel 100 with the finger. This point in time is denoted by $t_0$ ($t=t_0$). It is noted that FIG. 1(B) has a mathematical expression, $p_c < p_{th}$, which will be referenced in the later description of a second embodiment of the invention. Next, the user makes the finger shift from a current status where the finger is held motionless and in contact with the screen, to a status where the finger starts sliding up (in FIG. 1(B), left), without releasing from the screen. The starting time of this finger-slide motion is denoted by $t_{s2}$ ($t=t_{s2}$). In this scenario, it turns out that the finger contact point continuously stays still for a duration ($t_{s2}-t_0$) (i.e., a stationary-contact duration or a finger stay duration).

In response to an event occurring where the duration ($t_{s2}-t_0$) is equal to or longer than the predetermined duration $t_{TH}$ ($=(t_{s2}-t_0) \geq t_{TH}$), a mode activating unit 124 (see FIG. 5) as described below invokes the touch focus mode. Thereafter, an integral image containing the plurality of icons 104 is displayed stationarily and motionlessly, despite any finger-slide motions. It is noted that, once the condition expressed by "($t_{s2}-t_0) \geq t_{TH}$" as described above is satisfied, the finger's further stay would not end the touch focus mode.

As illustrated also in FIG. 1(B), the user moves the finger while swiping the finger across the displayed image. Thereafter, the user finds the desired icon 104 and moves the finger up to a location in the region of the desired icon 104 being displayed. One of the user's motions occurring in the course of the touch focus mode, which is performed by the user to make the finger contact point overlap the region of the desired icon 104 being displayed, will be hereinafter referred to as "focus motion."

It is noted that the user's gesture in which a finger touch on the screen at a point within the region of the desired icon 104 being displayed is followed by a finger stay to hold the finger contact point to continuously overlap the region of the desired icon 104 being displayed also qualifies as the focus motion. The focus motion is performed by the user to select the desired icon 104, and serves as a preparatory or run-up motion to help the user to correctly perform a subsequent motion for activating a function assigned to the desired icon 104.

In addition, once the finger contact point reaches a location that allows it to overlap the region of any one of the icons 104 being displayed, a haptic feedback arrangement 102 (see FIG. 4) as described below imparts to the user's finger, vibrations to make the user imagine the use of a physical button (i.e., vibrations substantially simulating or mimicking a tactile response that the finger would experience when pressing a physical button instead of a virtual button). This allows the user to ascertain through tactile sensation that the user's focus motion has been successfully accepted, with the user's more reliable and assured feeling when manipulating the device.

In this regard, an example of the vibrations to make the user imagine the use of a physical button is as follows:

First, points located within the region of each icon 104 being displayed, are each assigned height information to indicate that each icon 104 has virtual heights (i.e., virtual thicknesses measured vertical to the display screen).

Next, after the finger comes closer to the region of each icon 104 being displayed and enter the region, vibrations are imparted to the finger with the intensity varying depending on how steep the virtual slope of the region of each icon 104 being displayed, wherein the virtual slope is calculated based on the height information. This allows the user to have the same tactile sensation through the finger, that the user would experience if the user slides the finger while tracking a projecting surface of a physical push-button.

It is noted that, in a preferable example, the touch focus mode (a focus motion) automatically ends when the user removes the finger from the touch panel 100.

As described above, each of the embodiments of the invention determines whether or not a finger contact point has been continuously held stationarily for a duration equal to or longer than the predetermined duration $t_{TH}$, and selects one of input modes depending on the determination result. As a result, even a finger-touch-and-slide motion does not always qualify as a drag motion, and even a finger-touch-and-slide motion can invoke the touch focus mode with ease. In addition, when this touch focus mode is invoked, an integral image is displayed stationarily, on which the user can swipe the finger across the touch panel 100, and as a result, the user can correctly perform a focus motion for selecting one of the plurality of icons 104 arranged on the display screen.

FIG. 2 is a front view of the mobile information device 1 and a side view illustrating an example of a series of finger motions, both for explaining a click motion.

FIG. 2(A) is a front view of the mobile information device 1. In an example depicted in this front view, the user swipes the finger across the touch panel 100 with the finger in contact with the touch panel 100, in the course of the touch focus mode. Eventually, the finger reaches the desired icon 104, resulting in the creation of an overlap between the finger contact point and the region of the desired icon 104 being displayed. At this point, if the user presses the touch panel 100 with the finger with a greater force, then the function pre-assigned to the desired icon 104 is invoked. The user's motion of press on a selected icon 104 (the touch panel 100) for invoking the function of the icon 104 will be hereinafter referred to as "click motion."

FIG. 2(B) is a schematic diagram of finger motions for explaining the conditions to be met for recognizing a click motion. In an example depicted in this schematic diagram, the user swipes the finger across the touch panel 100, in the course of the touch focus mode, and eventually, the finger contact point overlaps the region of the desired icon 104 being displayed. This is a focus motion. It is possible that, at this point, the user's finger is imparted vibrations $v_1$ to make the user have the same tactile sensation that the user would experience if the user actually presses a physical push-button, by means of the haptic feedback arrangement 102 (see FIG. 4) as described below.

Subsequently, if the user, at this point, presses the touch panel 100 with the finger with a greater force, resulting in an increase of the pressing force $p_c$ up to a value equal to or greater than a pressing-force threshold $p_{TH}$ ($p_c \geq p_{TH}$), then this action is recognized as a click motion, and the function of the desired icon 104 that has been selected by the user is invoked. For a motion to qualify as a click motion, the condition that the pressing force $p_c$ is equal to or greater than the pressing-force threshold $p_{TH}$ must be satisfied. It is noted that the pressing force $p_c$ is measured by the pressing-force sensor 103 (see FIG. 4) as described below.

In addition, it is also possible that the user's finger is imparted vibrations $v_2$ to make the user have the same tactile sensation that the user would experience if the user actually presses a physical push-button, by means of the haptic feedback arrangement 102 (see FIG. 4) as described below. Hence, when the user performs a focus motion, the user experiences the vibrations $v_1$ to make the user imagine the use of a physical push-button through the vibrations $v_1$, and when the user follows up with a click motion with the user's confidence that arises from the user's previous tactile sensation through the vibrations $v_1$, the user experiences the vibrations $v_2$.

Because of this arrangement, the user experiences a sensation when the user presses the desired icon 104 actually in the form of a virtual push-button, as if the user pressed a physical push-button. As a result, even the user's manipulation on the touch panel 100 can simulate a reliable and assured feeling that the user would experience when actually manipulating a physical push-button.

FIG. 3 is a front view of the mobile information device 1 and a side view illustrating an example of a series of finger motions, both for explanation of a drag mode.

FIG. 3(A) is a front view of the mobile information device 1. The drag mode will be described with reference to this front view. In an example depicted in FIG. 3(A), the finger touches the touch panel 100 and then immediately slides upward without removing from the touch panel 100.

As the finger slides, an integral image containing the icons 104 slides upward by the same distance as that of the finger-slide motion, and, as a result, some of the plurality of icons 104 that had not appeared on the display screen newly come in on the display screen from the bottom side of the display screen. This finger motion for sliding the integral image, that is, a mode for enabling a so-called drag motion is referred to as a drag mode.

The drag mode is invoked in, for example, a case where the desired icon 104 is hidden outside the display screen, with the need of sliding an integral image including the hidden icon 104 on the display screen, to make the hidden icon 104 appear on the display screen, a case where an information content such as a textual document is not entirely displayed on the display screen, and has a hidden and remaining portion, with the need of sliding the information content to make the remaining portion appear on the display screen, to allow the user's further browsing of the remaining portion, etc.

FIG. 3(B) is a schematic diagram of finger motions for explanation of the conditions to be met for invoking the drag mode as described above. In an example depicted in this schematic diagram, first, the user touches the touch panel 100 with the finger. This point in time is denoted by $t_0$ ($t=t_0$). It is noted that FIG. 3(B) has a mathematical expression, $p_c < p_{th}$, which will be referenced in the later description of the second embodiment of the invention.

Next, the user makes the finger shift from a current status where the finger is held motionless and in contact with the screen, to a status where the finger starts sliding up (in FIG. 3(B), left), without releasing from the screen. The starting time of this finger-slide motion is denoted by $t_{s1}$ ($t=t_{s1}$). In this scenario, it turns out that the finger contact point continuously stays still for a duration ($t_{s1}-t_0$). In response to an event occurring where the duration ($t_{s1}-t_o$) is shorter than the predetermined duration $t_{TH}$ (=($t_{s1}-t_0$)<$t_{TH}$), the mode activating unit 124 (see FIG. 5) as described below invokes the drag mode. Thereafter, as the finger slides, an integral image containing the desired icon 104 slides.

In this regard, the moving distance of the integral image may be equal to that of the finger, or may be a function of the moving distance of the finger, such as a product of the moving distance of the finger and a constant factor. In addition, naturally, the direction in which the finger slides is not limited to an upward direction. For example, when the user slides the finger on the surface of the display screen in any one of directions, the integral image can slide in a direction corresponding to the finger-slide direction, that is, a corresponding one of an upward direction, a downward direction, a leftward direction, a rightward direction, and other oblique directions.

In addition, the predetermined duration $t_{TH}$ as described above is set to a value longer than an average duration $t_{AV1}$ required from the beginning of a finger touch on the display screen until the beginning of a subsequent finger-slide motion on the display screen, with the user's intention to perform a drag motion. For achieving this setting process, for example, many users were each made to intentionally slide an image, the lengths of finger-stationary-contact durations were measured as a plurality of sampled values, and the predetermined duration $t_{TH}$ is set to a value far larger than the average $t_{AV1}$ of those sampled values.

Further, the predetermined duration $t_{TH}$ as described above is also set to a value shorter than an average duration $t_{AV2}$ from the beginning of a finger touch on the display screen until the beginning of a subsequent finger-slide motion on the display screen, with the user's intention to perform a motion for selecting a particular object displayed on the display screen (e.g., a user browses the plurality of icons 104 displayed together on the display screen, while staying the finger on the touch screen at any location, the user makes a decision to select one of the icons 104 as a desired icon, holding the finger stationarily, and, after the user's decision (mental behavior), the user slides the finger towards the desired icon 104).

For achieving this setting process, for example, many users were each made to select a particular object, the lengths of finger-stationary-contact were measured as a plurality of sampled values, and the predetermined duration $t_{TH}$ is set to a value shorter than the average $t_{AV2}$ of those sampled values.

In this regard, when both of the averages $t_{AV1}$ and $t_{AV2}$ are used, it turns out that the predetermined duration $t_{TH}$ is set to satisfy the condition expressed by $t_{AV1} < t_{TH} < t_{AV2}$. In a more specific example, the $t_{TH}$ value is set as 200 milliseconds.

Figure 4:
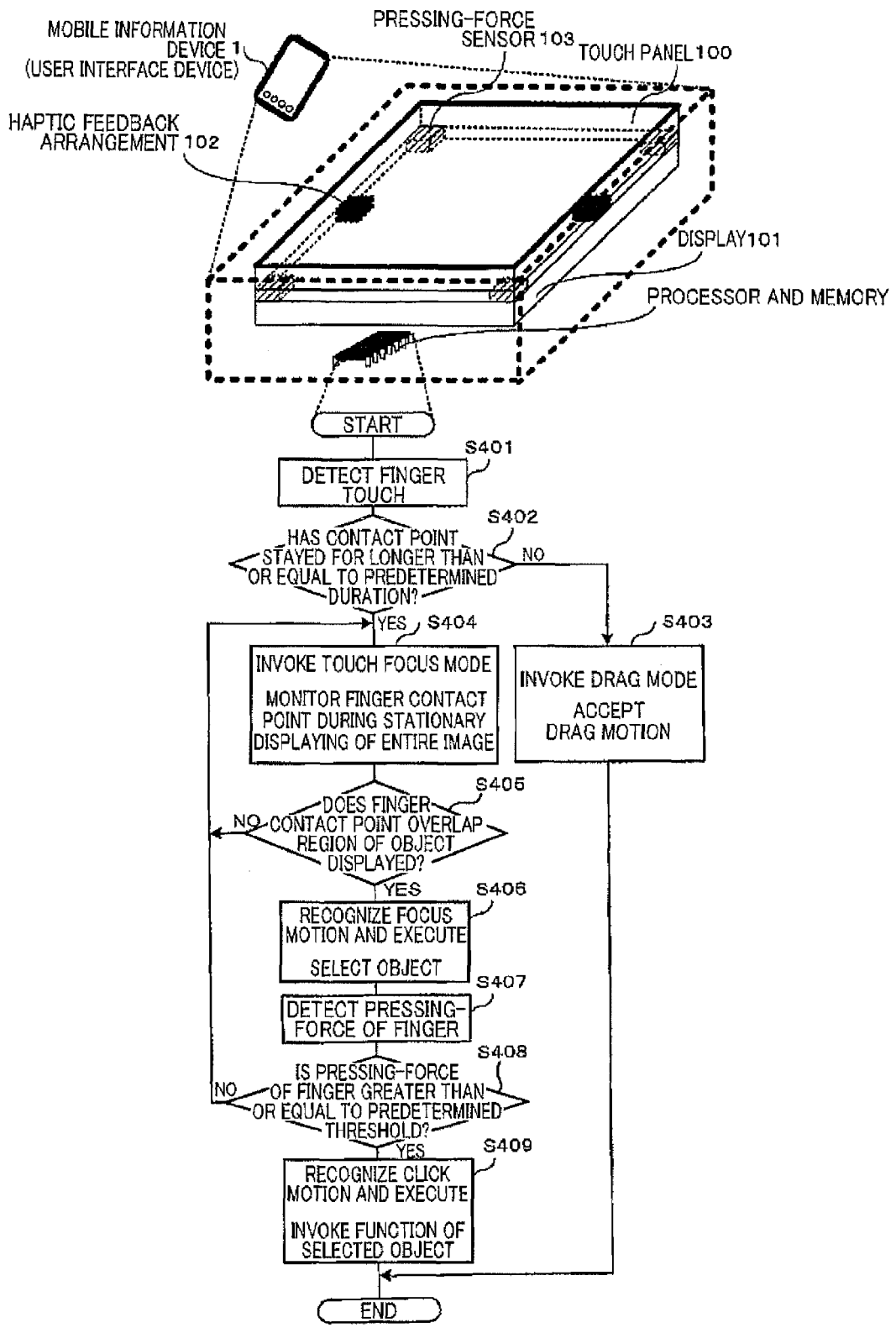
FIG. 4 is a perspective view illustrating the entire construction of the mobile information device depicted in FIG. 1, together with a flowchart conceptually illustrating an input-motion recognition method executed in the mobile information device.
Figure 5:
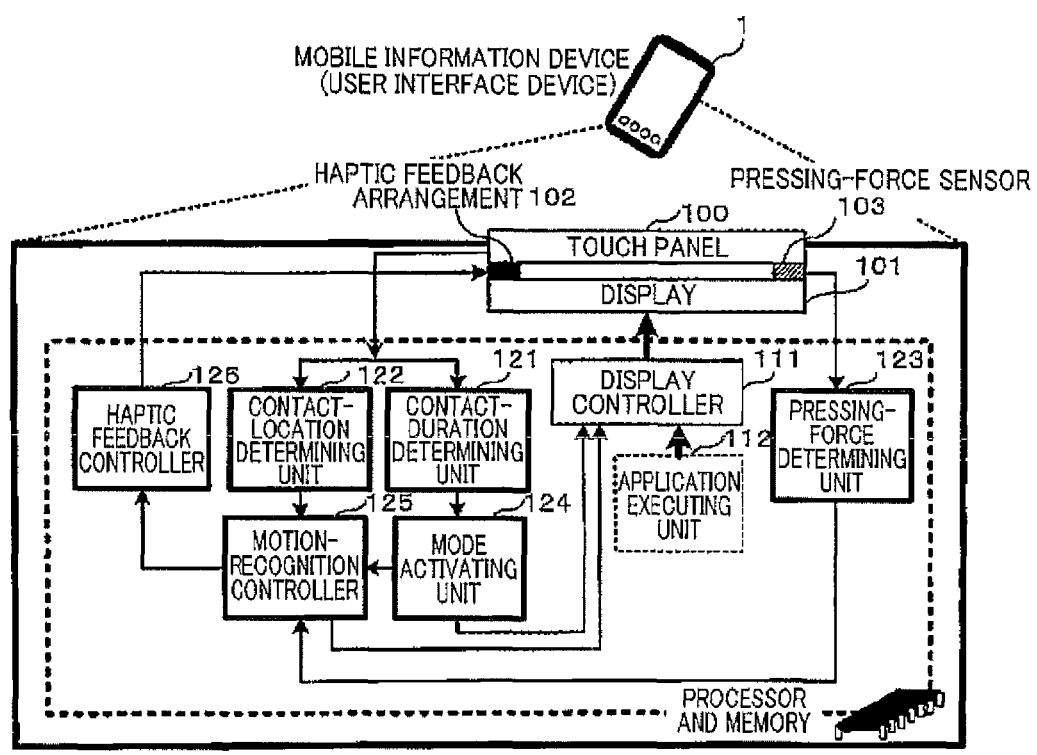
FIG. 5 is a functional block diagram conceptually illustrating the mobile information device depicted in FIG. 4.

FIG. 4 is a perspective view illustrating the entire construction of the mobile information device, together with a flowchart conceptually illustrating an input-motion recognition method executed in the mobile information device 1. In addition, FIG. 5 is a functional block diagram conceptually illustrating the mobile information device 1.

As illustrated in FIG. 4, the mobile information device 1 is constructed to include the touch panel 100, the display 101, the haptic feedback arrangement 102, the pressing-force sensor 103, and a processor and memory. In this regard, the processor and memory executes a program for performing the input-motion recognition method, to thereby provide the function of the program.

For the processor and memory, as well known, a process and a memory together constitute a computer. The memory among them stores the program for performing the input-motion recognition method. The memory is an example of a computer-readable and non-transitory storage medium having stored therein the program.

The display 101 is configured to display an image containing the icons (each constitute an example of an object) to be manipulate by the user. The surface of the display 101 is a display screen on which an image is displayed. In addition, the touch panel 100 is disposed over the display screen of the display 101 (in this embodiment, the touch panel 100 and the display 101 are disposed to face each other with a plate-like space left therebetween), and is configured to sense and output successive locations of a finger contact point over time. The surface of the touch panel 100 is a touch screen which the user touches with the fingertip for operating the mobile information device 1.

The touch screen is physically laid over the display screen, but, for the touch panel 100 to transfer information indicative of the location of a finger contact point to the display 101, to thereby allow the display 101 visually indicate a location corresponding to the location of the finger contact point, it is not necessary to physically lay the touch screen over the display screen.

The touch panel 100 may be a projected capacitive touch panel, a surface capacitive touch panel, a resistive touch panel, an ultra-sonic surface acoustic wave touch panel, an infra-red touch panel, or the like.

When the display 101 and the touch panel 100 are constructed in a so-called dual layer type in which a display function and a touch panel function are provided by separate devices, the display screen of the display 101 and the touch screen of the touch panel 100 are separate from each other, and the touch screen is laid over the display screen, and alternatively, when the display 101 and the touch panel 100 are constructed in a so-called single layer type in which a display function and a touch panel function are provided by a single device, the display screen of the display 101 also serves as the touch screen of the touch panel 100.

The haptic feedback arrangement 102 is configured to vibrate the touch panel 100, to thereby impart to the user's finger in contact with the touch panel 100, haptic feedback as a response to the user's particular motions. The haptic feedback arrangement 102 becomes active in response to the user's focus motion on the touch panel 100, to impart to the finger vibrations $v_1$ (see FIG. 2(B)) through which the user feels as if the finger experienced when pressing a physical push-button. In addition, the haptic feedback arrangement 102 also becomes active in response to the user's click motion on the touch panel 100, to impart to the finger vibrations $v_2$ (see FIG. 2(B)) through which the user feels as if the finger experienced when pressing a physical push-button. The haptic feedback arrangement 102 may be, for example, in the form of a piezoelectric actuator formed with piezoelectric materials such as PZT (Lead Zirconate Titanate).

In the present embodiment, the haptic feedback arrangement 102 is sandwiched between the touch panel 100 and the display 101 (e.g., a liquid crystal layer). In addition, in the present embodiment, a single vibrator or an array of spaced-apart vibrators is incorporated in the mobile information device 1, such that the vibrator (s) covers a silhouette obtained by projecting the mobile information device 1 in a direction normal to its surface, not entirely but locally, and the single vibrator alone or the vibrators in the array together constitute a haptic feedback device.

The pressing-force sensor 103 is used to detect a pressing force $p_c$ with which the user presses the touch panel 100 with the finger. In an example, the pressing-force sensor 103 is disposed at each of four corners of the touch panel 100, and the pressing force $p_c$ is measured by averaging four component forces with which the pressing-force sensors 103 are pressed at the four corners, respectively, by slight deflection created in the touch panel 100 with the pressing finger. If the pressing force $p_c$ measured using the pressing-force sensor 103(s) is equal to or larger than the predetermined pressing-force threshold $p_{TH}$ ($p_c \geq p_{TH}$) then it is determined that a click motion has been performed. In an example, the pressing-force sensor 103 may be in the form of a piezoelectric sensor formed with piezoelectric materials such as PZT. In another example, the pressing-force sensor 103 can be used to serve as a haptic feedback arrangement, instead of or in addition to the haptic feedback arrangement 102 formed with a piezoelectric actuator.

In the present embodiment, the pressing-force sensor 103 is sandwiched between the touch panel 100 and the display 101 (e.g., a liquid crystal layer). In addition, in the present embodiment, a single pressure sensor or an array of spaced-apart pressure sensors is incorporated in the mobile information device 1, such that the pressure sensor(s) covers a silhouette obtained by projecting the mobile information device 1 in a direction normal to its surface, not entirely but locally, and the single pressure sensor alone or the pressure sensors in the array together constitute a pressing-force sensing device.

Furthermore, in the present embodiment, a plurality of pressure sensors are disposed within a plate-like space left between the touch panel 100 and the display 101, such that the pressure sensors are arranged along the plane of the space so as to be mutually spaced apart, and so, voids are purposely created which are not filled with any pressure sensor between the touch panel 100 and the display 101. These voids help the touch panel 100 to elastically deflect in response to the user's local application of a pressing force to the touch panel 100. The deflection benefits the user in that the user can experience a tactile sensation that the user actually pushes the touch panel 100.

The above-mentioned processor and memory is configured to input a contact-location signal indicative of the location of a finger contact point from the touch panel and input a pressing-force signal from the pressing-force sensor 103, select and invoke one of the input modes depending of the inputted signals, recognize the type of the user's actual input-motion, and execute an operation corresponding to the recognized input-motion. Now, the configuration of the processor and memory will be described with reference to FIG. 5.

As illustrated in FIG. 5, the processor and memory is constructed to incorporate a contact-duration determining unit 121, a contact-location determining unit 122, a pressing-force determining unit 123, the mode activating unit 124, a motion-recognition controller 125, the haptic feedback controller 126, a display controller 111, and an application executing unit 112.

The contact-duration determining unit 121 is configured to input the contact-location signal from the touch panel 100, and determine whether or not a finger contact point has stayed for a duration equal to or longer than the predetermined duration $t_{TH}$ since the beginning of a finger-touch motion, and output the determination result to the mode activating unit 124. The contact-location determining unit 121 is configured to determine whether or not the finger contact point overlaps the region of any one of the icons 104 being displayed on the screen, and output the determination result to the motion-recognition controller 125. The pressing-force determining unit 123 is configured to input the pressing-force signal from the pressing-force sensor 103, determine whether the force with which the finger presses the touch panel 100 is equal to or larger than the predetermined pressing-force threshold $p_{TH}$, and output the determination result to the motion-recognition controller 125.

The mode activating unit 124 is configured to select one of input modes, which are a touch focus mode and a drag mode, as an active input-mode and invoke the selected input-mode, based on the determination result obtained from the contact-duration determining unit 121. The motion-recognition controller 125 is configured to be operable in the course of the touch focus mode, to determine whether or not a current finger-motion qualifies as a focus motion, based on the determination result obtained from the contact-location determining unit 122, and, if a focus motion is detected, then the motion-recognition controller 125 invokes an operation corresponding to the focus motion. Furthermore, the motion-recognition controller 125 is configured to be operable also in the course of the touch focus mode, to determine whether or not a current finger-motion qualifies as a click motion, based on the determination result obtained from the pressing-force determining unit 123, and, if a click motion is detected, then the motion-recognition controller 125 invokes an operation corresponding to the click motion. The haptic feedback controller 126 is configured to control the haptic feedback arrangement 102 to impart an associated haptic feedback to the user's finger, based on the determination result obtained from the motion-recognition controller 125.

The display controller 111 is configured to input application execution information from the application executing unit 112, and command the display 101 to display an image associated with an application being executed, on the display screen. In addition, the display controller 111 is configured to input indication information indicative of which one of the touch focus mode and the drag mode has been selected as an active input-mode, from the mode activating unit 124, and command the display 101 to display an image corresponding to the indicated input mode on the display screen. Further, the display controller 111 is configured to input indication information indicative of which one of possible input-motions is being performed, from the motion-recognition controller 125, and command the display 101 to display an image corresponding to the indicated input motion on the display screen.

Referring next to a flowchart depicted in FIG. 4, the input-motion recognition method to be executed by the processor and memory will be described.

As illustrated in FIG. 4, as a first step, the touch panel 100 operates to detect a finger touch on the screen (step S401). Next, the contact-duration determining unit 121 determines whether a finger contact point on the screen has been continuously held stationarily for a duration equal to or longer than the predetermined duration $t_{TH}$ (step S402). In this regard, the location of a finger contact point on the screen is expressed, using an x-y coordinate system fixed with regard to the surface of the touch panel 100 (i.e., a touch screen), as one coordinate (x, y). It is noted that a finger-touch motion can be detected by detecting a finger contact area having a particular size on the screen, and in this case, the coordinate of the location of the center or centroid of the finger contact area (i.e., a center coordinate) may be handled as a finger contact point.

In addition, steps S401 and S402 are executed, for example, such that, assuming that the user does not remove the finger off the touch screen of the touch panel 100, a comparison is repeated between a value of a previously-detected finger contact point and a value of a currently-detected finger contact point, and if the comparison indicates that both values are substantially coincident with each other, then it is determined that the finger contact point has been held stationarily.

The finger contact point can be subject to a slight unintended variation in position over time due to a normal finger-shake occurring when the user touches the touch panel 100 with the finger. In an example, to avoid false determination due to the unintended positional variation, a correction is made to remove a variation in the coordinate of the finger contact point. In addition, in another example, the range of a possible variation in position of a finger contact point due to a finger's shake in a finger-press motion is predicted beforehand, and, if an actual variation in the coordinate falls within the predicted range of variation, then the actual variation is not regarded as an effective change in position of the finger contact point. In any case, a determination as to whether a finger contact point has been continuously held in position can be made while being unaffected by its unintended positional variation due to the finger's shake. In other words, the user's motion can be recognized in a reliable and assured manner so as to follow the user's true intent.

If the contact-duration determining unit 121 determines that a finger contact point has been continuously held in position for a duration equal to or longer than the predetermined duration t.sub.TH, then the mode activating unit 124 invokes a touch focus mode (step S404). More specifically, while displaying an integral image containing the icons 104 stationarily, a finger contact point (or the contact-location signal indicative of the finger location delivered from the touch panel 100) is monitored.

If, however, the contact-duration determining unit 121 determines that a finger contact point has slid or moved within the predetermined duration $t_{TH}$, then the mode activating unit 124 invokes a drag mode (step S403). More specifically, the device is brought into a status where the integral image containing the icons 104 can slide in a direction designated by the user's finger drag motion.

Describing these steps above described again from a user-operator's viewpoint, if a finger's touch on the touch panel is immediately followed by the finger's sliding motion, then the mode activating unit 124 invokes a drag mode, and if the user touches the touch panel with the finger and has held the finger at the same contact location for at least the predetermined duration $t_{TH}$, then the mode activating unit 124 invokes a touch focus mode.

Next, in response to the activation of the touch focus mode, the contact-location determining unit 122 determines whether or not the finger contact point overlaps the region of anyone of the icons 104 being displayed (step S405). If the contact-location determining unit 122 determines that the finger contact point overlaps the region of the one icon 104 being displayed, then the motion-recognition controller 125 determines that a focus motion has been performed, and invokes its associated operation (step S406). More specifically, one of the icons 104 being displayed on the display screen, which the finger contact point overlaps, is selected. In this phase, the haptic feedback controller 126 preferably imparts a tactile feedback (a response to the user's touch) to the user's finger via the haptic feedback arrangement 102. In addition, the motion-recognition controller 125 preferably causes the display 101 to display the selected icon 104 with visual emphasis on the screen, via the display controller 111.

Next, the pressing-force sensor 103 detects a pressing force $p_c$ with which the user presses the touch panel 100 with the finger in contact with the touch panel 100 (step S407). Subsequently, the pressing-force determining unit 112 determines whether or not the pressing force $p_c$ is equal to or greater than the predetermined pressing-force threshold $p_{TH}$ (step S408).

Next, only if the contact-location determining unit 110 determines that the finger contact point overlaps the region of any one of the icons 104 being displayed, and the pressing-force determining unit 112 determines that the pressing force $p_c$ is equal to or greater than the pressing-force threshold $p_{TH}$, then the motion-recognition controller 114 determines that a click motion has been performed, and invokes its associated operation (step S409). More specifically, the motion-recognition controller 114 activates the function pre-assigned to the selected icon 104, for example, a predetermined application.

Thus, in the present embodiment, a determination is made as to whether or not a finger contact point has been continuously held in position for a duration equal to or longer than the predetermined duration $t_{TH}$, and, based on the determination result, one of a touch focus mode and a drag mode is invoked. So, when the user performs a motion, a correct determination is made as to which one of a motion occurring during the touch focus mode or a drag motion occurring during the drag the user-performed motion qualifies as, through a sifting or differentiating process, and additionally, when the user performs a motion in the course of the touch focus mode, a correct determination is made as to which one of a focus motion and a click motion the user-performed motion qualifies as, through a sifting or differentiating process. In other words, with each motion in the form of combinations of a plurality of primitive or elementary motions including at least a finger-touch motion and a finger-slide motion among a finger-touch motion, a finger-stay motion, and a finger-slide motion, the user can perform different input motions such that these motions can be distinctively recognized with precision.

Next, a mobile information device 1 according to an illustrative second embodiment of the present invention will be described. The present embodiment, however, has elements common with those in the first embodiment; therefore, a redundant description of the elements common with those of the first embodiment will be omitted by referencing the same names or the same numerical references, and the present embodiment will be described in detail with regard to only different elements from those of the first embodiment.

In a case, the user feels it necessary that, from the very first, the user touches the finger to a portion of the touch screen of the touch panel 100, which overlaps the region of the desired icon 104 being displayed (hereinafter, referred to as "icon-displaying area"), and then immediately performs a click motion ("immediate click-motion"). In this case, it is possible that, as soon as the user touches the finger to the icon-displaying area, the user presses the touch panel 100 with a force equal to or greater than a predetermined threshold.

In this case, in the first embodiment of the invention, if the predetermined duration $t_{TH}$ does not expire since a first finger-touch is detected, then a determination is not made as to whether or not the user has performed a click motion. For this reason, the user can have the impression that the mobile information device 1 is slow in response to the user's click motion. The reason is that, in the first embodiment, after the predetermined duration $t_{TH}$ expires since a first finger-touch is detected, a touch focus mode is recognized; after the touch focus mode is initiated, the user's motion is determined to qualify as a focus motion; and before the intensity of the finger touch increases to a value equal to or greater than a predetermined threshold, the user's motion is not determined to qualify as a click motion.

In contrast, in the present embodiment, upon detection of a first finger-touch, without waiting for the predetermined duration $t_{TH}$ to expire since the detection point in time, the user's motion is determined to qualify as a click motion, if the finger contact point overlaps the icon-displaying area, and the intensity of the finger touch on the touch screen is equal to or greater than the predetermined threshold.

The intensity of a finger touch is defined by at least one of a force with which the finger presses the touch panel; the size of an area in which the finger touches the touch screen; a change in electrical property in response to a finger touch on the touch screen; and a change in temperature r in response to a finger touch on the touch screen.

As a result, in the present embodiment, when the user needs to invoke a touch focus mode, the user must manipulate the touch panel 100 in a manner that the intensity of a finger touch on the touch screen does not increase up to the predetermined threshold, that is, for example, as expressed by the mathematical expressions depicted in FIGS. 1 and 3 as described above, and as described below with reference to FIG. 6, the pressing force $p_c$ occurring at a first finger-touch on the touch panel 100 is below the predetermined threshold $p_{TH}$ ($p_c < p_{TH}$).

FIG. 6 is a front view of the mobile information device 1 and a side view illustrating an example of a series of finger motions, for explanation of a click motion in the present embodiment ("immediate click-motion").

Figures 6A, 6B:
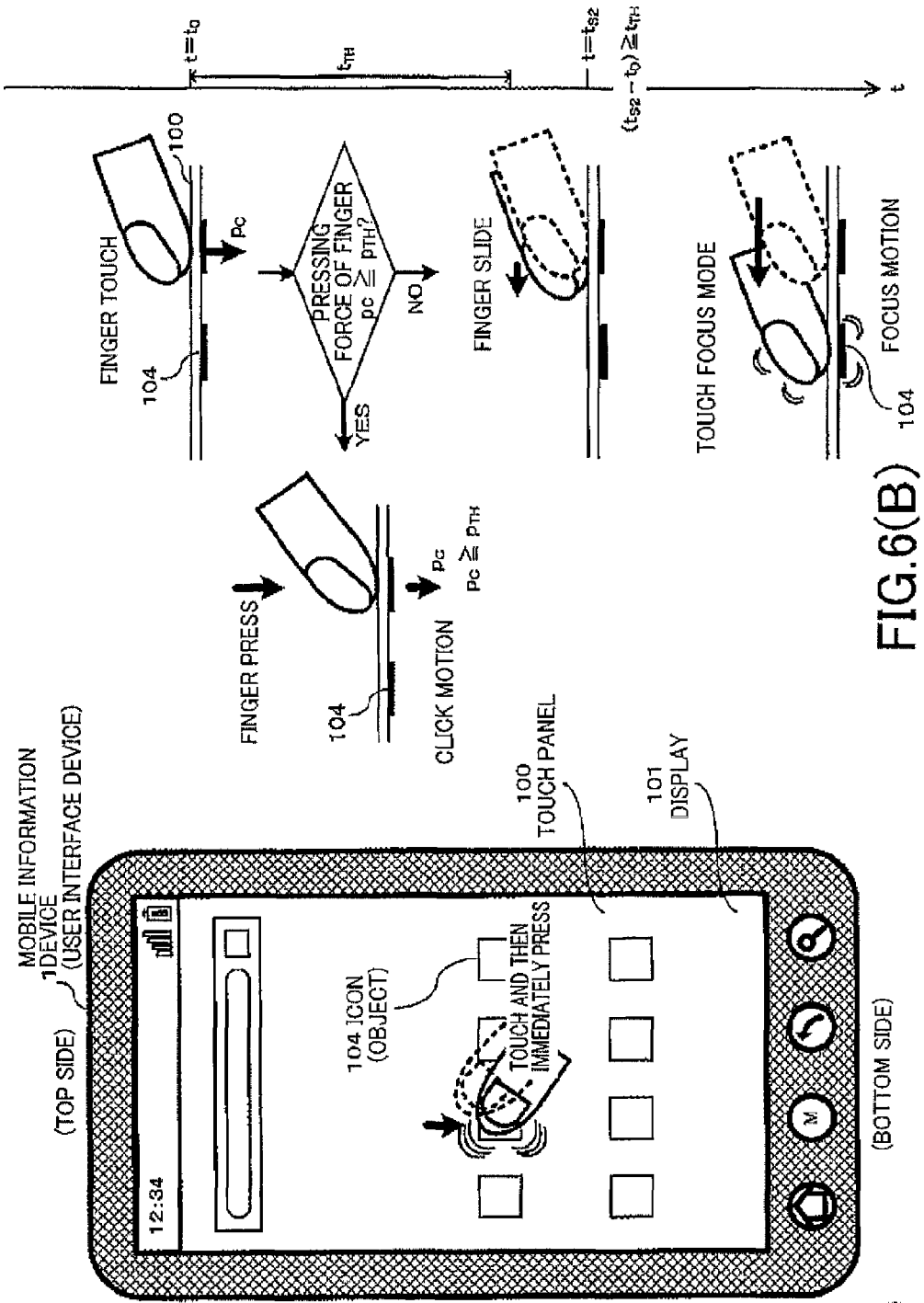
FIG. 6(A) is a front view illustrating a mobile information device incorporating a user interface device according to a second illustrative embodiment of the invention, together with a user's finger motions occurring in a click motion.
FIG. 6(B) is a side view illustrating the user's finger motions occurring in the click motion and a touch focus mode in enlargement.

FIG. 6(A) is a front view illustrating the mobile information device 1 similar with that depicted in FIG. 1(A). Also in this drawing, an image containing a plurality of icons 104 is displayed on the display screen of the display 101. In the hope to invoke one of the displayed icons 104 as a desired icon 104, the user touches the desired icon 104 from the very first, and then immediately presses or pushes the desired icon 104 (the touch panel 100). This immediately triggers the function pre-assigned to the desired icon 104.

This finger-press motion starts as soon as the finger touches the screen, and the predetermined duration $t_{TH}$ does not currently expire, failing to enter the above-described touch focus mode. In addition, a pressing force $p_c$ applied by the user currently satisfies $p_c \geq p_{TH}$. Further, the finger contact point overlaps the region of the desired icon 104 being displayed. As a result, the required condition is currently met, and so, it is determined that a click motion has been performed, resulting in activation of the function pre-assigned to the desired icon 104.

When the user performs this click motion ("immediate click-motion") to trigger the function of the particular icon, unlike when the user performs a click motion during the touch focus mode (see FIG. 2) to trigger the same function, there is no need to wait for at least the predetermined duration $t_{TH}$ to elapse since the beginning of the finger-touch motion. As a result, if the user touches a finger to the screen from above and then immediately presses the desired icon 104 with the finger, then the user can immediately invoke the function pre-assigned to the desired icon 104.

It is noted that, if the user first touches and then immediately presses the screen at a point outside the regions of the icons 104 being displayed, then no determination is made that this motion qualifies as a click motion. In this case, like the first embodiment depicted in FIG. 1, a determination is made as to whether or not the finger contact point has been continuously held in position for a duration equal to or longer than the predetermined duration $t_{TH}$ (i.e., whether or not a touch focus mode is to be invoked).

FIG. 6(B) is a schematic diagram of finger motions for explanation of the conditions to be met for accepting a click motion in which a finger touch is immediately followed by a finger press ("immediate click-motion"). In an example depicted in this schematic diagram, a finger first touches one of the icons 104 (the touch panel 100). This point in time is denoted by $t_0$ ($t=t_0$). Next, the finger presses or pushes the one icon 104, which is performed as a continuous motion from the first finger-touch (without experiencing any other different motions).

In this regard, a determination is made as to whether or not a pressing force $p_c$ with which the finger presses the screen satisfies $p_c \geq p_{TH}$. This determination is made before a determination is made as to whether or not a current finger contact point has been continuously held in position for a duration $(t_{s2}-t_0)$, that is, whether or not $(t_{s2}-t_0) \geq t_{TH}$ is satisfied. As a result, if a motion like the click motion described above has been performed, then a determination is made that the pressing force $p_c$ is equal to or greater than the predetermined threshold $p_{TH}$, before the predetermined duration $t_{TH}$ expires.

If it is determined that the pressing force $p_c$ is equal to or greater than the predetermined threshold $p_{TH}$, then a determination is made as to whether or not a finger contact point overlaps the region of any one of the icons 104 being displayed. If a determination is made that the finger contact point overlaps the region of any one of the icons 104 being displayed, then it is determined that a click motion has been performed, and the function pre-assigned to the current icon 104 is invoked. If, however, a determination is made that the finger contact point does not overlap any regions of the icons 104 being displayed, then, like the first embodiment depicted in FIG. 1, a determination is made as to whether or not a current finger contact point has been continuously held in position for a duration equal to or longer than the predetermined duration $t_{TH}$ (i.e., whether or not a touch focus mode is to be activated).

As described above, in the present embodiment, if the user touches a finger to the screen from above and then immediately presses the desired icon 104 with the finger, then the user can immediately invoke the function pre-assigned to the desired icon 104, without entering a touch focus mode. As a result, the operability of the device is improved owing to the quicker response.

In addition, the haptic feedback arrangement 102 (see FIG. 5) as described below can also impart a haptic feedback in the form of the vibrations $v_2$ to the finger with which the user has performed a click motion ("immediate click-motion") as described above.

Figure 7:
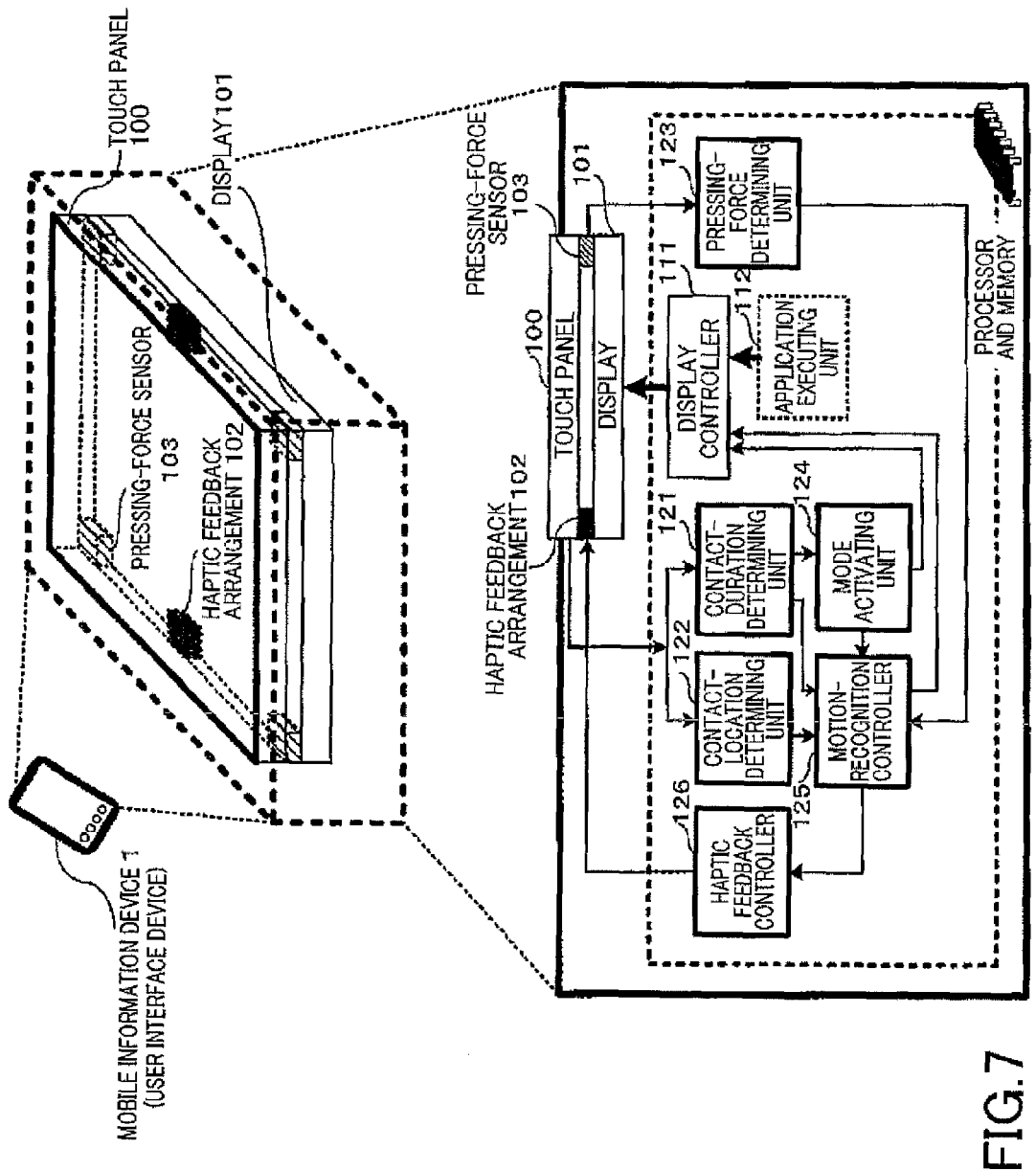
FIG. 7 is a perspective view illustrating the entire construction of the mobile information device depicted in FIG. 6, together with a functional block diagram conceptually illustrating the mobile information device.

FIG. 7 is a perspective view illustrative of the entire hardware configuration of the mobile information device 1, and a functional block diagram conceptually illustrating the entire software configuration of the mobile information device 1.

As illustrated in FIG. 7, like the first embodiment, the mobile information device 1 is constructed to include the touch panel 100, the display 101, the haptic feedback arrangement 102, the pressing-force sensor 103, and the processor and memory.

As also illustrated in FIG. 7, the processor and memory is constructed to incorporate the contact-duration determining unit 121, the contact-location determining unit 122, the pressing-force determining unit 123, the mode activating unit 124, the motion-recognition controller 125, the haptic feedback controller 126, the display controller 111, and the application executing unit 112.

These components function like corresponding components in the first embodiment depicted in FIG. 5, except for the motion-recognition controller 125. The motion-recognition controller 125 includes a first click determining unit like the first embodiment. The first click determining unit is configured to be operable in response to an event occurring in which, during a touch focus mode, the contact-location determining unit 122 has determined that a finger contact point overlaps the region of any one of the icons 104 being displayed, and the pressing-force determining unit 123 has determined that the pressing force $p_c$ is equal to or greater than the predetermined threshold $p_{TH}$, to determine that the user's motion qualifies as a click motion for invoking the function of a current icon 104 that has been provisionally selected by the user.

The motion-recognition controller 125 further includes a second click determining unit, unlike the first embodiment. The second click determining unit is configured to be operable in response to an event occurring in which, after a finger touch on the touch screen starts, the contact-location determining unit 122 has determined that a finger contact point overlaps the region of any one of the icons 104 being displayed, and the pressing-force determining unit 123 has determined that the pressing force $p_c$ is equal to or greater than the predetermined threshold $p_{TH}$, irrespective of whether or not the contact-duration determining unit 121 determines that the stationary-contact duration or the duration of a stationary contact $(t_{s2}-t_0)$ is equal to or longer than the predetermined duration $t_{TH}$, to determine that the user has performed a click motion for invoking the function of the current icon 104 that has provisionally been selected by the user.

Figure 8:
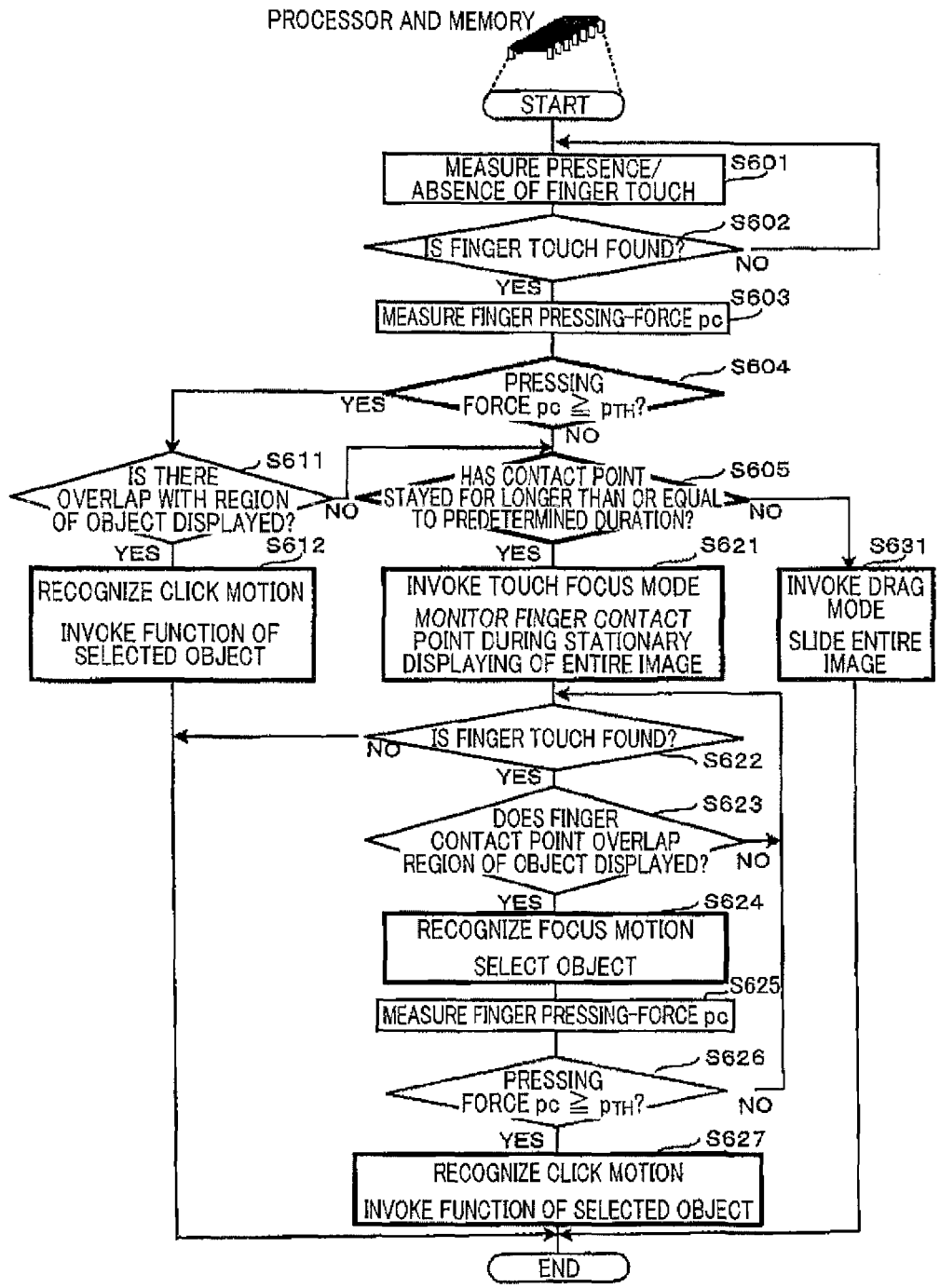
FIG. 8 is a flowchart conceptually illustrating an input-motion recognition method executed in the mobile information device depicted in FIG. 7.

The addition of the second click determining unit allows a clickmotion in which a finger touch is immediately followed a finger press ("immediate click motion") to be recognized, and a corresponding function to the immediate click motion is invoked Next, an input-motion recognition method to be executed by the processor and memory will be described with reference to a flowchart depicted in FIG. 8.

(S601) First, presence/absence of a finger touch is measured.

(S602) It is determined as to whether or not a finger is in contact with the touch panel 100.

(S603) The pressing-force sensor 103 measures the pressing force $p_c$ applied by a finger in contact with the touch panel 100.

(S604) Next, the pressing-force determining unit 123 determines whether or not the pressing force $p_c$ detected by the pressing-force sensor 103 is equal to or greater than the predetermined pressing-force threshold $p_{TH}$.

(S611) If step S604 determines $p_c \geq p_{TH}$, then the contact-location determining unit 122 determines whether or not the finger contact point overlaps the region of any one of the icons 104 being displayed. If, however, step S604 determines $p_c < p_{TH}$, then this method proceeds to step S605 to determine whether or not a touch focus mode is to be invoked.

(S612) If step S611 determines that there is an overlap with the region of any one of the icons 104 being displayed, then it is determined that a click motion ("immediate click-motion") has been performed, and the corresponding operation is invoked. More specifically, the function of the one icon 104, for example, a predetermined application is activated.

(S605) If step S604 determines $p_c < p_{TH}$ (i.e., no immediate click-motion has been performed), then the contact-duration determining unit 121 determines whether or not a finger contact point on the screen has been continuously held stationarily for a duration equal to or longer than the predetermined duration $t_{TH}$.

(S621) If step S605 determines that the finger contact point has been continuously held stationarily for a duration equal to or longer than the predetermined duration $t_{TH}$, then the mode activating unit 124 invokes a touch focus mode. More specifically, while an integral image containing the plurality of icons 104 is made to be held in position, a finger contact point (i.e., the finger-contact-location signal outputted from the touch panel) is monitored.

(S631) If, however, step S605 determines that the finger contact point has moved before the predetermined duration $t_{TH}$ expires, then the mode activating unit 124 invokes a drag mode. More specifically, an integral image containing the plurality of icons 104 is made to be able to slide in a direction designated by a finger drag motion.

(S622) Next, activation of a touch focus mode is followed by a determination as to whether or not there is a finger touch on the touch panel 100. If it is determined that there is a finger touch, then this method proceeds to step S623. If, however, it is determined that there is no finger touch, then it is recognized that there is a finger release from the touch panel 100 and a finger motion ends, and this input-motion recognition method ends.

(S623) The contact-location determining unit 122 determines whether or not a finger contact point overlaps the region of any one of the icons 104 being displayed.

(S624) If step S623 determines that a finger contact point overlaps the region of any one of the icons 104 being displayed, then the motion-recognition controller 125 determines that a focus motion has been performed, and invokes an associated operation. More specifically, one of the icons 104 which a finger contact point overlaps is selected. It is preferable that, at this moment, the haptic feedback controller 126 imparts a haptic feedback to the finger via the haptic feedback arrangement 102. In addition, it is also preferable that the motion-recognition controller 125 instructs the display 101 to display the selected icon 104 with visual emphasis via the display controller 111.

(S625) Next, the pressing-force sensor 103 detects a pressing force $p_c$ applied by a finger touching the touch panel 100.

(S626) Next, the pressing-force determining unit 123 determines whether or not the pressing force $p_c$ detected by the pressing-force sensor 103 is equal to or greater than the predetermined pressing-force threshold $p_{TH}$.

(S627) The motion-recognition controller 125 is operable in response to an event occurring in which the contact-location determining unit 122 has determined that a finger contact point overlaps the region of any one of the icons 104 being displayed, and in which, in step S626, the pressing-force determining unit 112 has determined that the pressing force $p_c$ is equal to or greater than the predetermined pressing-force threshold $p_{TH}$, to determine that a click motion has been performed, and invoke its associated operation. More specifically, the function of a currently-selected icon 104, that is, for example, a predetermined application is invoked.

As described above, in the present embodiment, if the user touches the finger to any one of the icons (objects) 104 and then immediately presses the one icon 104 with the finger, then a click motion ("immediate click-motion") is performed, without any waiting time as described above. As a result, in the present embodiment, with each motion in the form of combinations of a plurality of primitive or elementary motions including at least a finger-touch motion and a finger-slide motion among a finger-touch motion, a finger-stay motion, and a finger-slide motion, the user can perform different input motions such that these motions can be distinctively recognized with precision.

FIG. 9 is a perspective view illustrative of the exterior of user interface devices according to other embodiments of the invention.

Figure 9A:
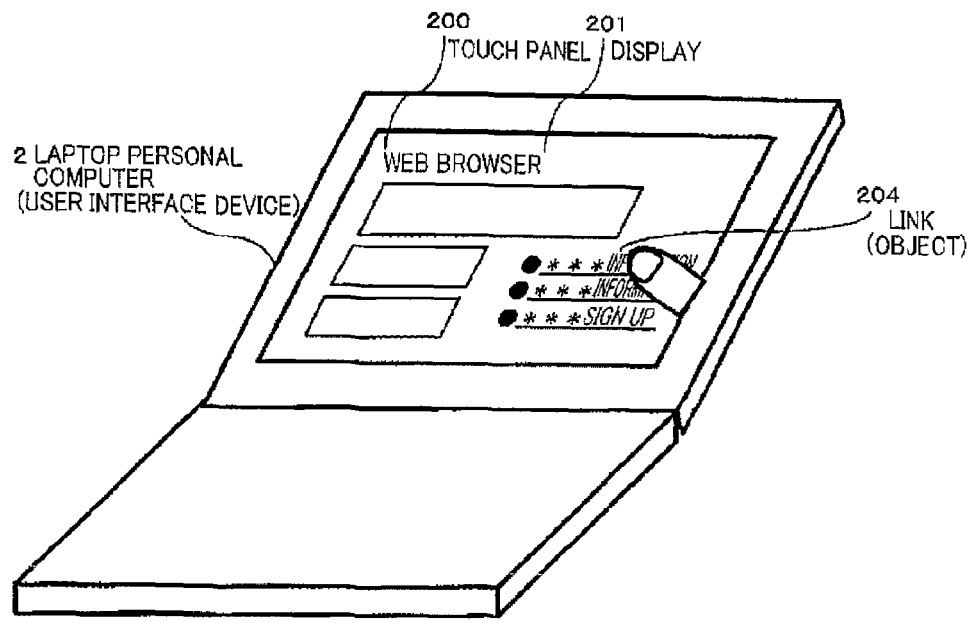
FIG. 9(A) is a perspective view illustrating the exterior of a device incorporating a user interface device according to another embodiment of the invention.

FIG. 9(A) is a perspective view of a laptop personal computer 2 incorporating a device that is equipped with a user interface device according to another embodiment of the invention. In the laptop personal computer 2, a web browser is active for allowing a user to browse a web page, and an image containing a plurality of links (each link constitutes another example of the object) 204 is displayed in a display 201.

When the user needs to browse a portion of a web page being viewed which is not currently displayed on the display 201, if the user touches the finger to a touch panel 200 and then immediately slides the finger, then a drag mode is invoked to allow the user to perform a drag motion. In this scenario, performing a finger-slide motion such that it follows a first finger touch before the predetermined duration $t_{TH}$ expires after the first finger touch is a key action for the user to invoke a drag mode.

On the other hand, when the user needs to check whether or not there is a desired link 204 in a portion of a web page being displayed on the display 201, the user touches the finger to the touch panel 200 at a provisional location, and holds the finger in position for at least the predetermined duration $t_{TH}$. This invokes a touch focus mode. Next, the user performs a focus motion by sliding the finger in contact, to the region of the user-detected, desired link 204 being displayed. Next, the user performs a click motion by pressing the touch panel 200 with the finger with a force equal to or greater than the predetermined pressing-force threshold $p_{TH}$, and this motion invokes the function of the desired link 204, which allows the user to view a textual content, graphical content, etc. provided by a website indicated by the desired link 204.

Figure 9B:
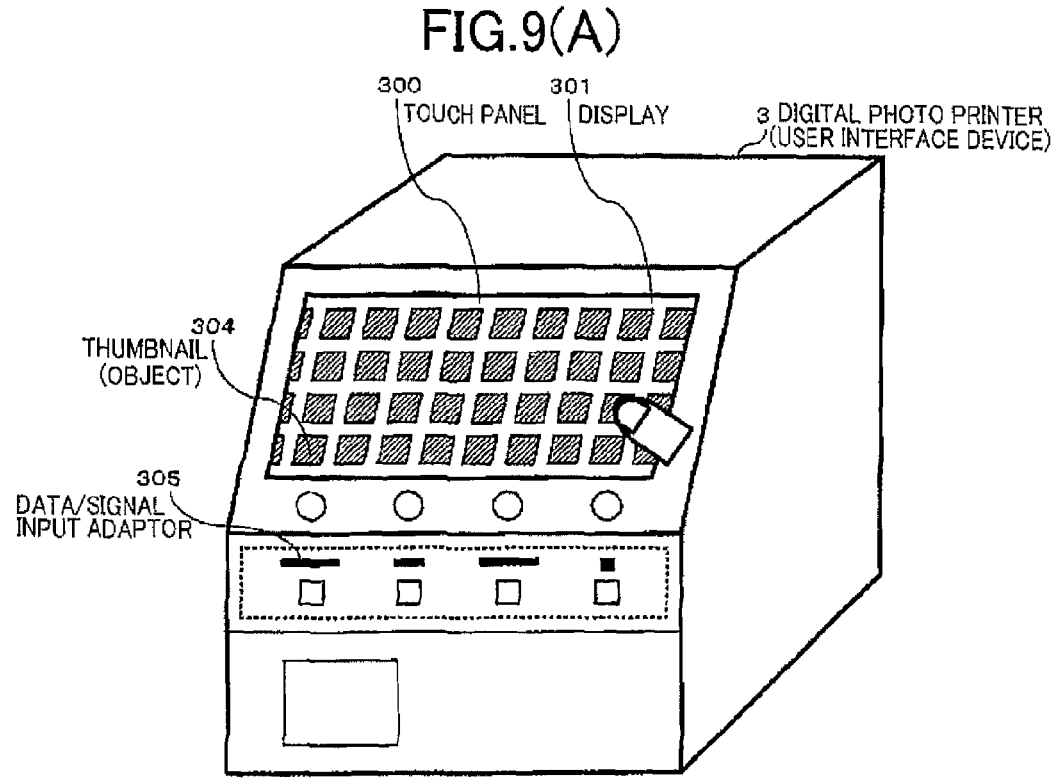
FIG. 9(B) is a perspective view illustrating the exterior of a device incorporating a user interface device according to still another embodiment of the invention.

FIG. 9(B) is a perspective view of a digital photo printer 3 incorporating a user interface device according to still another embodiment of the invention. The digital photo printer 3 stores a large number of digital photo data sets that have been captured through one of a plurality of format-distinct signal/data input adaptors 305, which has been selected by the user, and a display 301 displays a plurality of thumbnails (each constitutes still another example of the object) 304 that correspond to the captured digital photo data sets.

When the user needs to view ones of the plurality of thumbnails 304 which are not currently displayed on the display 301, if the user touches the finger to the touch panel 300 and then immediately slides the finger, then a drag mode is invoked and a drag motion is performed by the user. In this phase, performing a finger-slide motion such that it follows a first finger touch before the predetermined duration $t_{TH}$ expires after the first finger touch is a key action for the user to invoke a drag mode.

On the other hand, when the user needs to check whether or not a desired thumbnail 304 is being displayed on the display 301, the user touches the finger to the touch panel 300 at a provisional location, and holds the finger in position for at least the predetermined duration $t_{TH}$. This invokes a touch focus mode. Next, the user performs a focus motion by sliding the finger in contact, to the region of the user-detected, desired thumbnail 304 being displayed. Next, the user performs a click motion by pressing the touch panel 300 with the finger with a force equal to or greater than the predetermined pressing-force threshold $p_{TH}$, to thereby select the desired thumbnail 304, for example, for providing instructions to make a photo using a corresponding one of the digital photo data sets.

It is noted that, in each of the embodiments depicted in FIGS. 9(A) and 9(B), there is a case where the plurality of links 204 or thumbnails 304 are displayed on the display 201 or 301 such that they are so closely spaced that the user is hard to touch the finger to the screen at a location outside of the regions of the links 204 or the thumbnails 304 being displayed. Even in this case, these embodiments select one of input modes by determining whether or not a finger contact point has been held in position for longer than or equal to the predetermined threshold $t_{TH}$, or whether or not a finger-stationary-contact duration is longer than or equal to the predetermined threshold $t_{TH}$. As a result, wherever a first finger-contact is made, a drag mode can be invoked with ease and the user can perform a drag motion with certainty.

It is further noted that, in each of the embodiments depicted in FIGS. 9(A) and 9(B), there is a case where a first finger-contact is undesirably made on the display 201 or 301 outside of the region of the desired link 204 or the desired thumbnail 304 being displayed (including areas within the regions of the remaining links 204 or thumbnails 304). Even in this case, these embodiments select one of input modes by determining whether or not a finger contact point has been held in position for longer than or equal to the predetermined threshold $t_{TH}$. As a result, wherever a first finger-contact is made, a touch focus mode can be invoked with ease and the user can perform a focus motion to select the desired link 204 or thumbnail 304 with certainty.

As will be readily understood from the foregoing, the user interface devices, the input-motion recognition methods and the programs, each of which is according to the above-mentioned embodiments of the invention, provide effects that, for the user to perform an input motion by touching the finger to the display screen, there are a plurality of different available types of finger motions that can be correctly accepted by sliding the finger in touch with the display screen, which enables the user to perform input motions or operations by touching the finger to the touch panel in a plurality of different modes.

In other words, a user can perform an additional input motion in distinction from a drag motion, because the additional input motion has an additional elementary motion that is a finger stay, although the additional input motion shares a composite motion of two different primitive or elementary motions that are a finger touch and a finger slide, with a drag motion. As a result, a user can perform input motions by touching the finger to the screen in a plurality of modes.

In addition, the user interface devices, the input-motion recognition methods and the programs, each of which is according to these embodiments of the invention, provide effects that, when a user performs an input motion by touching the user's finger to the display screen, the user can select a desired object as a result of the user's action of swiping the finger across an image being displayed on a display screen.

Additionally, in these embodiments of the invention, the touch screen on which a finger touches is typically flat-shaped. On the other hand, when a user performs an input motion by touching the finger (e.g., a thumb) to a display screen, the user bends the finger while making its base serving as an almost stationary hinge, and as a result, the fingertip has a tendency to perform not a rectilinear motion but a circular motion. Therefore, when the shape of the touch screen has a two- or three-dimensional curved surface, which has a contour that fits the fingertip's movement locus, and which bulges in a direction away from the fingertip, the user can manipulate the touch panel with the finger without removing the finger from the touch screen.

While some of embodiments of the present invention have been described above in detail with reference to the drawings, they are just examples, and the present invention may be embodied in alternative modes, which begin with the modes described in the section titled "Summary of the Invention," or which are obtained by making various modifications and improvements to the above-described embodiments, in view of the knowledge of those skilled in the art.

The invention claimed is:

1. A touch screen display device comprising:
   a touch panel;
   a display screen;
   a pressing force sensor connected to the touch panel and configured to determine a pressing force of a finger against the touch panel; and
   a processor connected to the touch panel, the display screen and the pressing force sensor, the processor programmed to:
   determine whether or not a stationary-contact duration during which the finger contact point is held substantially stationarily on the touch panel is equal to or longer than a predetermined duration;
   in response to a determination that the stationary-contact duration is equal to or longer than the predetermined duration, activate a touch focus mode and start monitoring a touch-and-slide motion where the user's finger maintains contact with the touch panel while a location of the finger contact point with the touch panel changes, and after the monitoring of the touch-and-slide motion starts:
      control the display screen to stationarily or fixedly display an image of a plurality of objects on the display screen;
      monitor changes to the location of the finger contact point on the touch panel, and monitor, via the pressing force sensor, the pressing force of the finger on the touch panel;
      determine whether or not the location of the finger contact point overlaps one of the plurality of objects displayed on the display screen during the touch focus mode, and determine whether the pressing force of the finger against the touch panel is equal to or greater than a predetermined pressing force threshold; and
      in response to determinations that the finger contact point overlaps one object of the plurality of objects displayed on the display screen, and that the pressing force of the finger against the touch panel becomes equal to or greater than the predetermined pressing force threshold, determine that the user has performed a click motion that invokes a function assigned to the one overlapping object among the plurality of objects, thereby allowing the user to perform one or more pressing force-initiated click motions during the touch-and-slide motion while the image of the plurality of objects is stationarily or fixedly displayed on the display screen.

2. The touch screen display device according to claim 1, wherein the processor is further programmed to activate a drag mode when the stationary-contact duration does not equal or exceed the predetermined duration.

3. The touch screen display device according to claim 1, further comprising: a haptic feedback arrangement configured to impart haptic feedback to the user's finger in contact with the touch panel, wherein the processor is further programmed to:

in response to the determination that the finger contact point, during the touch-and-slide motion, overlaps one object of the plurality of objects displayed on the display screen, control the haptic feedback arrangement to impart haptic feedback to the finger via the touch panel.

4. The touch screen display device according to claim 1, further comprising: a haptic feedback arrangement configured to impart haptic feedback to the user's finger in contact with the touch panel, wherein the processor is further programmed to:

in response to a determination that the user has performed the click motion, control the haptic feedback arrangement to impart haptic feedback to the finger via the touch panel.

5. The touch screen display device according to claim 1, wherein the processor is further programmed to, in response to determinations that the finger contact point overlaps the one object of the plurality of objects displayed on the display screen, that the pressing force is equal to or greater than the predetermined threshold, and that the stationary-contact duration is not equal to or longer than the predetermined duration, determine that the user has performed, during a drag mode where the image scrolls with the user's finger movement on the touch panel, the click motion for invoking the function assigned to the one overlapping object among the plurality of objects, without implementing the steps intended for the touch-and-slide motion.

6. The touch screen display device according to claim 1, wherein the predetermined duration is longer than an average duration required from a beginning of a finger touch on the touch panel until a beginning of a subsequent finger-slide motion on the touch panel when a user's intention is to perform a drag motion, and is shorter than an average duration required from the beginning of the finger touch on the touch panel until the beginning of the subsequent finger-slide motion on the touch panel when the user's intention is to perform a motion for selecting an object displayed on the display screen.

7. The touch screen display device according to claim 1, wherein the processor is further programmed to measure the stationary-contact duration, irrespective of whether or not the finger's contact point overlaps a region of the object displayed on the display screen.

8. A method comprising:

determining, by a processor of a touch screen display device, whether or not a stationary-contact duration during which a finger contact point is held substantially stationarily on a touch panel of the touch screen display device is equal to or longer than a predetermined duration;

in response to a determination that the stationary-contact duration is equal to or longer than the predetermined duration, activating a touch focus mode and starting, by the processor, monitoring a touch-and-slide motion where the user's finger maintains contact with the touch panel while a location of the finger contact point with the touch panel changes, and after the monitoring of the touch-and-slide motion starts:

controlling, by the processor, a display screen of the touch screen display device to stationarily or fixedly display an image of a plurality of objects on the display screen;

monitoring, by the processor, changes to the location of the finger contact point on the touch panel, and monitoring, by the processor via a pressing force sensor connected to the touch panel, a pressing force of the finger against the touch panel;

determining, by the processor, whether or not the location of the finger contact point overlaps one object of the plurality of objects displayed on the display screen during the touch focus mode, and determining, by the processor, whether the pressing force of the finger against the touch panel is equal to or greater than a predetermined pressing force threshold; and in response to determinations that the finger contact point overlaps the one object of the plurality of objects displayed on the display screen, and that the pressing force of the finger against the touch panel is equal to or greater than the pressing force threshold, determining, by the processor, that the user has performed a click motion that invokes a function assigned to the one overlapping object among the plurality of objects, thereby allowing the user to perform one or more pressing force-initiated click motions during the touch-and-slide motion while the image of the plurality of objects is stationarily or fixedly displayed on the display screen.

9. The method according to claim 8, wherein the determination of whether or not the stationary-contact duration is equal to or longer than the predetermined duration is performed irrespective of whether or not the finger's contact point overlaps any one of the plurality of objects displayed on the display screen.

10. A non-transitory computer readable storage medium which has stored therein a program that, when executed by a computer, performs the method according to claim 8.

11. A method comprising:

after a finger of a user touches a touch panel of a touch screen display device, determining, by a processor connected to the touch panel, whether the finger contact point is held at a substantially same location for a duration equal to or longer than a predetermined duration, and, if the finger contact point is determined to be held at the substantially same location for the duration equal to or longer than the predetermined duration, while the finger maintains contact with the touch panel despite any later finger-slide motions on the touch panel:

activating a touch focus mode and controlling, by the processor, a display screen of the touch screen display device to stationarily or fixedly display an image of a plurality of objects on the display screen;

monitoring, by the processor, changes to the location of the finger contact point on the touch panel during the touch focus mode, and determining whether a match is made between the finger's contact point on the touch panel and a location of a desirable object of the plurality of objects stationarily or fixedly displayed on the display screen;

monitoring, by the processor via a sensor connected to the touch panel, an intensity of the user's finger touch with the touch panel, and determining, by the processor, whether the intensity of the user's finger touch with the touch panel is equal to or greater than a finger touch intensity threshold; and in response to determinations that the match is made between the finger's contact point and the location of the desirable object of the plurality of objects, and that the intensity of the finger touch with the touch panel is equal to or greater than the finger touch intensity threshold, determining that the user has performed a click motion for invoking, by the processor, a function pre-assigned to the one desirable object of the plurality of objects.

12. A non-transitory computer-readable storage medium which has stored therein a program that, when executed by a computer, performs the method according to claim 11.

13. The method according to claim 11, further comprising, in response to the invocation of the pre-assigned function of the one desirable object of the plurality of objects, imparting haptic feedback to the finger in touch with the touch screen via the touch panel.

* * * * *